US006065912A

United States Patent [19]

Bosten et al.

[11] Patent Number: 6,065,912

[45] Date of Patent: May 23, 2000

[54] ROUTER SWITCHING SYSTEM

[75] Inventors: Donald R. Bosten, Jackson; James T. Stolzer; Randy G. Cooper, both of Milan; Waymon L. McNeal, Jr., Jackson, all of Tenn.

[73] Assignee: Porter-Cable Corporation, Jackson, Tenn.

[21] Appl. No.: 09/192,898

[22] Filed: Nov. 16, 1998

[51] Int. Cl.[7] .......... B23C 1/20

[52] U.S. Cl. .......... 409/134; 144/136.95; 200/43.17; 408/710; 409/182

[58] Field of Search .......... 144/136.95, 154.5; 200/43.17, 43.11, 43.13; 408/124, 710; 409/134, 182, 229, 204, 206, 210, 218

[56] References Cited

U.S. PATENT DOCUMENTS

| | | | |
|---|---|---|---|
| Re. 33,045 | 9/1989 | Gronholz et al. . | |
| 1,581,720 | 1/1926 | Carter . | |
| 1,904,109 | 4/1933 | Wendorf . | |
| 3,587,387 | 6/1971 | Burrows | 408/710 |
| 3,767,876 | 10/1973 | Batson . | |
| 3,881,081 | 4/1975 | Schilling et al. . | |
| 4,051,880 | 10/1977 | Hestily . | |
| 4,244,406 | 1/1981 | Stielper | 144/136.95 |
| 4,316,685 | 2/1982 | George . | |
| 4,319,860 | 3/1982 | Beares . | |
| 4,323,100 | 4/1982 | Silken . | |
| 4,445,811 | 5/1984 | Sanders . | |
| 4,562,872 | 1/1986 | Fushiya et al. . | |
| 4,566,830 | 1/1986 | Maier et al. . | |
| 4,606,685 | 8/1986 | Maier et al. . | |
| 4,770,573 | 9/1988 | Monobe . | |
| 4,938,264 | 7/1990 | Ferenczffy . | |
| 4,938,642 | 7/1990 | Imahashi et al. . | |
| 5,078,557 | 1/1992 | McCracken . | |
| 5,088,865 | 2/1992 | Beth et al. . | |
| 5,094,575 | 3/1992 | Kieser et al. . | |
| 5,143,494 | 9/1992 | McCurry . | |
| 5,181,813 | 1/1993 | McCracken . | |
| 5,188,492 | 2/1993 | McCracken . | |
| 5,191,921 | 3/1993 | McCurry . | |

(List continued on next page.)

FOREIGN PATENT DOCUMENTS

| | | |
|---|---|---|
| 1015225 | 12/1965 | United Kingdom . |
| 1 590 290 | 5/1981 | United Kingdom . |
| 2 078 028 | 12/1981 | United Kingdom . |
| 2 145 678 | 4/1985 | United Kingdom . |
| 2 248 987 | 4/1992 | United Kingdom . |
| WO 87/04276 | 7/1987 | WIPO . |

OTHER PUBLICATIONS

"The Art of Woodworking Routing and Shaping," Time–Life Books, Alexandria, Virginia / St. Remy Press, Montreal and New York; pp. Cover pgs. and 9–35 and 117–139, ©1993 Time–Life Books Inc.

BOSCH Product Brochure, Operating/Safety Instructions, cover pg. and pp. 2–10, undated.

BOSCH Plunge Router Operating Instructions, cover pg. and pp. 2–19 (Apr. 1992).

DeWalt® Instruction Manual, DW624 Plunge Cut Router, DW625 Electronic Plunge Cut Router, 15 pgs., undated.

Porter–Cable Instruction Manual, Routers, cover pg. and pp. 2–28, Copyright© 1994, Porter–Cable Corporation.

*Primary Examiner*—Daniel W. Howell
*Attorney, Agent, or Firm*—Merchant & Gould P.C.

[57] ABSTRACT

Improvements made to a router include a switching system which is part of a router handle and which operates the router motor by connecting it to an external electrical power source. In a preferred embodiment, the present switching system comprises the use of a locking lever and trigger in combination to activate the motor, to hold the trigger in a locked-on position to maintain the connection of electrical power to the motor, and to lock the movement of the trigger from occurring before an operator attempts to engage the motor. The switching system may also be combined with a preferred router handle shape in order to make the long term operation of the router and its switching comfortable with extended use.

13 Claims, 31 Drawing Sheets

U.S. PATENT DOCUMENTS

| | | | |
|---|---|---|---|
| 5,207,253 | 5/1993 | Hoshino et al. . | |
| 5,273,089 | 12/1993 | Fuchs et al. . | |
| 5,308,201 | 5/1994 | Wilson et al. . | |
| 5,310,296 | 5/1994 | McCurry . | |
| 5,320,463 | 6/1994 | McCurry et al. . | |
| 5,353,852 | 10/1994 | Stolzer et al. . | |
| 5,428,197 | 6/1995 | McCurry et al. . | |
| 5,496,139 | 3/1996 | Ghode et al. . | |
| 5,570,776 | 11/1996 | Buchholz et al. . | |
| 5,584,620 | 12/1996 | Blickhan et al. . | |
| 5,590,988 | 1/1997 | Rusconi . | |
| 5,613,813 | 3/1997 | Winchester et al. . | |
| 5,638,945 | 6/1997 | Fukinuki et al. | 200/43.17 |
| 5,671,789 | 9/1997 | Stolzer et al. . | |
| 5,678,965 | 10/1997 | Strick . | |
| 5,725,036 | 3/1998 | Walter . | |

ROUTER SWITCHING SYSTEM

BACKGROUND AND SUMMARY OF THE INVENTION

The present invention is directed to router improvements. These improvements include a switching system which is part of a router handle and which operates the router motor by connecting it to an external electrical power source. In a preferred embodiment, the present switching system comprises the use of a locking lever and trigger in combination to activate the motor, to hold the trigger in a locked-on position to maintain the connection of electrical power to the motor, and to lock the movement of the trigger from occurring before an operator attempts to engage the motor. The switching system may also be combined with a preferred router handle shape in order to make the long term operation of the router and its switching comfortable with extended use.

A further improvement relates to a router chuck and collet mounting system. In a preferred embodiment, the present mounting system comprises mating a top face of a router chuck with the lower surface of an inner race of an armature shaft bearing and mating an inner diameter of the chuck with an outer diameter of the armature shaft to align the chuck with the shaft. Additionally, a cavity through the chuck may be used to accept a router bit shank so that it extends up into a lower end of the shaft in order to permit the shank to extend upward, closer to the armature shaft bearing. This arrangement reduces router bit run-out.

A further improvement relates to a plunge router locking system. The locking system comprises a locking arm lever coupled to a threaded member arm which engages a plunge guide post to hold the router motor housing at a desired height above the router base when the locking arm member is in the locked position. When the locking arm member is moved into an unlocked position, the motor housing can move up and down the plunge guide post, where the motor housing is opposed by a bias system comprising a compression spring to prevent the motor housing from free-falling into the router base. Additionally, the locking arm lever can be held in the unlocked position with the use of a mating coupling member attached to the motor housing in order to keep the plunge locking system in an unlocked position.

A further improvement relates to a switchable router brake system. The switchable brake system permits a motor brake to be selectably engaged to operate when the router motor is turned off. When engaged, the motor brake, which comprises a brake resistor being placed electrically across the motor windings, causes the router motor to stop rotating almost immediately. This feature, however, is not always desired; the switchable brake system permits the operator to engage the use of the brake only when desired, thus providing the option to selectively eliminate jerking caused electric brake torque induced in the router when the brake engages.

A further improvement relates to a plunge router depth stop system. The depth stop system comprises a depth stop rod contained within a restraining collar coupled to the router housing. The depth stop rod is configured both to rotate at a fixed height above the router base and to slide up and down within the collar in order to adjust its height above the base. At an upper end of the depth stop rod, a turret knob permits an operator to rotate the rod within the collar. At the other end of the rod, a protrusion portion selection member is located to engage selectively one of a plurality of stepwise rising depth stop position surfaces located on the router base. When the protrusion portion selection member is aligned vertically above one of the depth stop position surfaces, the motor housing will plunge until the protrusion portion selection member engages the depth stop position. The operator sets the depth stop height by placing the depth stop rod at the desired height and tightening a restraining collar. Once configured in this position, the motor housing can be repeatably plunged to a desired position. The operator can selectively step the depth downward by keeping the depth stop rod at the desired position while rotating the rod to align the protrusion portion selection member to another depth stop position having a different depth stop height.

A further improvement relates to ergonomic router handles. The preferred router handles are generally elliptical in shape and have one end narrower than the other end. The handles are shaped to provide an operator an infinite number of angles to which the operator's hand may effectively grip the handles. Additionally the handles provide an outer surface which provides a flat tactile grip area. The combination of these elements, along with the shape and location of the preferred trigger and locking arm switch used to activate the preferred router, provides an operator, while operating the router, with the ability to find and use a handle-holding position which is comfortable for the individual user for holding the handles.

A further improvement relates to a sub-base alignment system. In a preferred embodiment, the alignment system comprises a plurality of raised bosses which are located on the sub-base at known locations and which engage a plurality of recessed cavities in the router base. Alternatively, the raised bosses may be placed on the router base and the cavities may be located in the sub-base, or a combination of boss and cavity locations may be used. The router base is positioned at a known locations relative to the center of rotation of the router bit. For example, in the plunge router shown, the base is coupled to plunge guide posts, which themselves are coupled to the motor housing at known locations. The coupling of the raised bosses with the recessed cavities places the sub-base at a known position relative to the router base. In such a configuration, the outer edge of the sub-base, which may be used to guide the router when making a cut, is held at a known position relative to the center of rotation of the router chuck, thus enabling the precise guidance of the router relative to a guide member.

These and various other advantages and features of novelty which characterize router improvements are pointed out with particularity in the claims which are annexed hereto and which form a part hereof. However, for a better understanding of the improvements, their advantages, and the objects obtained by use of these improvements, reference should be made to the drawings which form a further part hereof, and to accompanying descriptions, in which there are illustrated and described specific examples of the improvements.

BRIEF DESCRIPTION OF THE DRAWINGS

Referring now to the drawings in which like reference numbers represent corresponding parts throughout.

DETAILED DESCRIPTION OF THE INVENTION

In the following description of an exemplary embodiment, reference is made to the accompanying drawings which form a part hereof, and in which is shown by way of illustration a specific embodiment in which the present invention may be practiced. It is to be understood that other embodiments may be utilized, as structural changes may be made without departing from the scope of the present invention.

Router Trigger Switching System

Figure 11A:
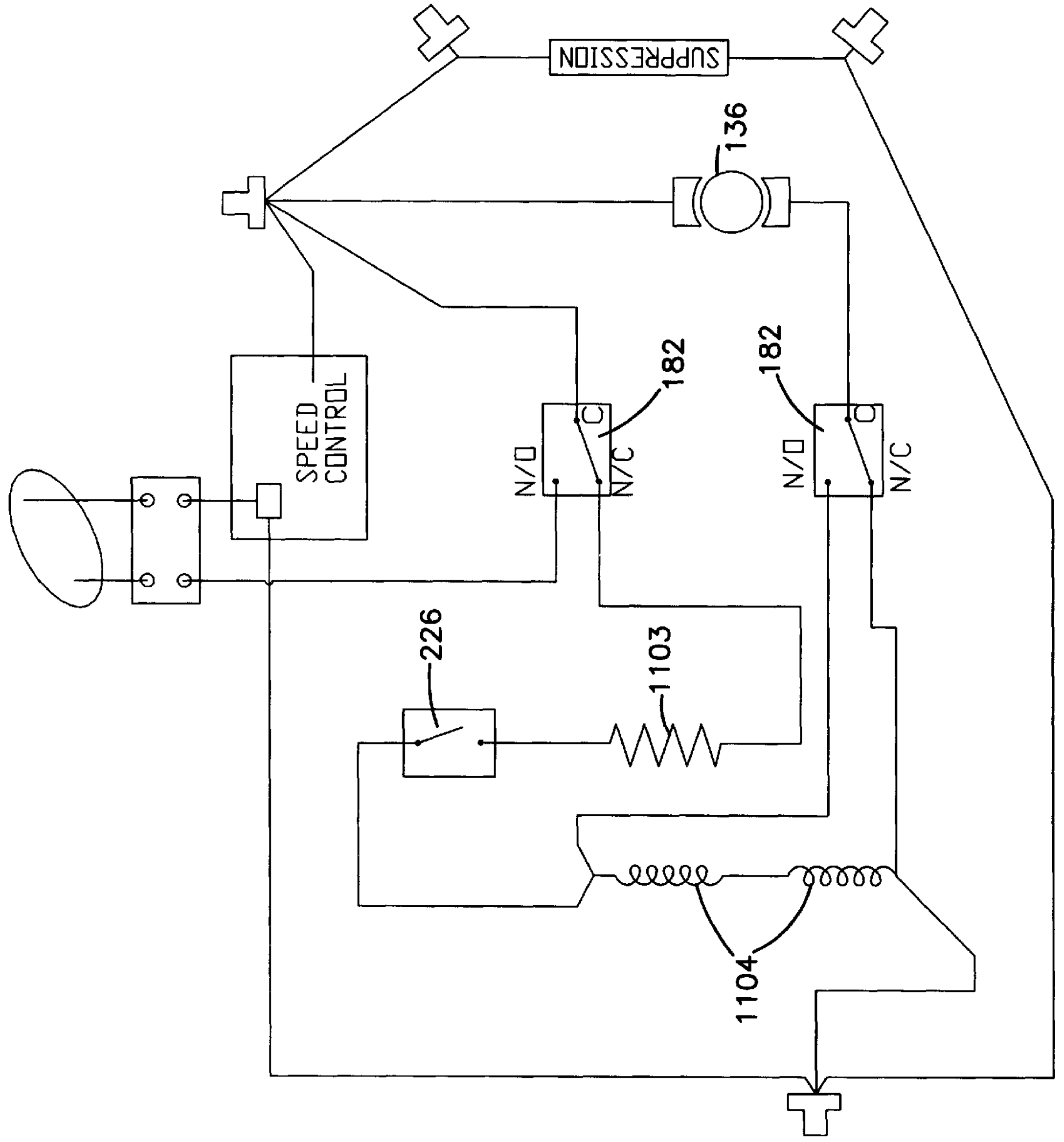
FIG. 11A illustrates a circuit diagram for a parallel on-off switching system according to another example embodiment of the present invention.

The present router may be configured at the time of router manufacture with both first and second switches, each in parallel either being usable to engage or disengage the router operation. In a two switch embodiment, a first switch is preferably a contact-type switch 182 coupled to a trigger 25 discussed in more detail below, and a second switch 226 may be configured as a toggle switch 226 located on top of the router. Second toggle switch 226 can be of particularly advantage when mounting the present router upside down in a router table. In such an embodiment, the first and second switches are wired in parallel, as shown in FIG. 11A, where either switch may be used to engage and disengage the router motor. First lockable switch 182 and trigger 25 combination is typically used when the router is hand-held. Second lockable switch 226 is particularly useful, for example, when the router is mounted upside down in a router table since toggle switch 226 typically is easily reached and operated when the router is in such a position.

Figure 11B:
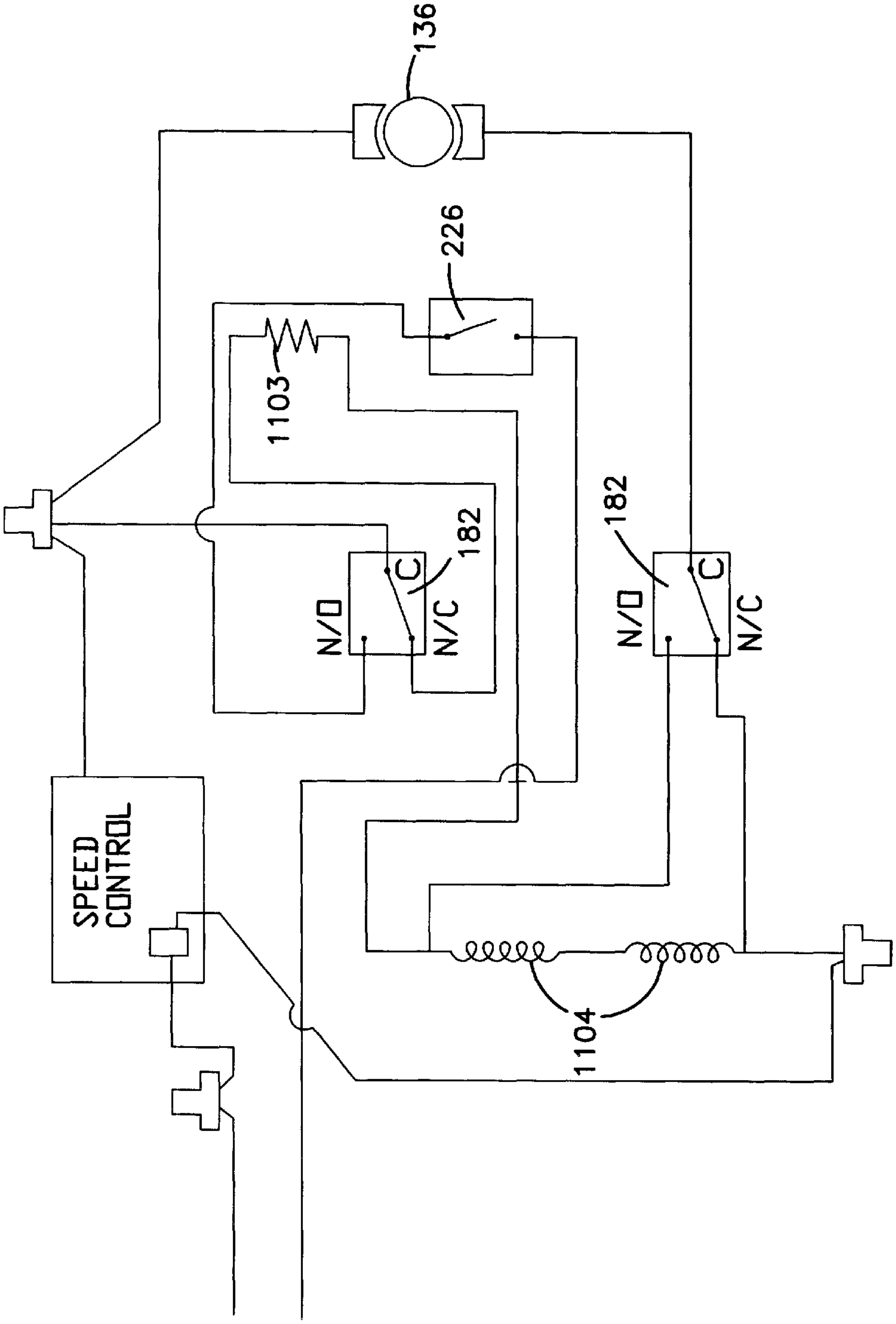
FIG. 11B illustrates a circuit diagram for a switchable motor brake system according to another example embodiment of the present invention.

Alternatively, the toggle switch 226 may be configured at the time of manufacture to operate as an engageable and disengageable router brake as discussed further below. In such an embodiment, the internal wiring of the router is shown in FIG. 11B. While the same components are used, compare FIGS. 11A and 11B, the circuits shown provide the functionality described further below.

Figure 7:
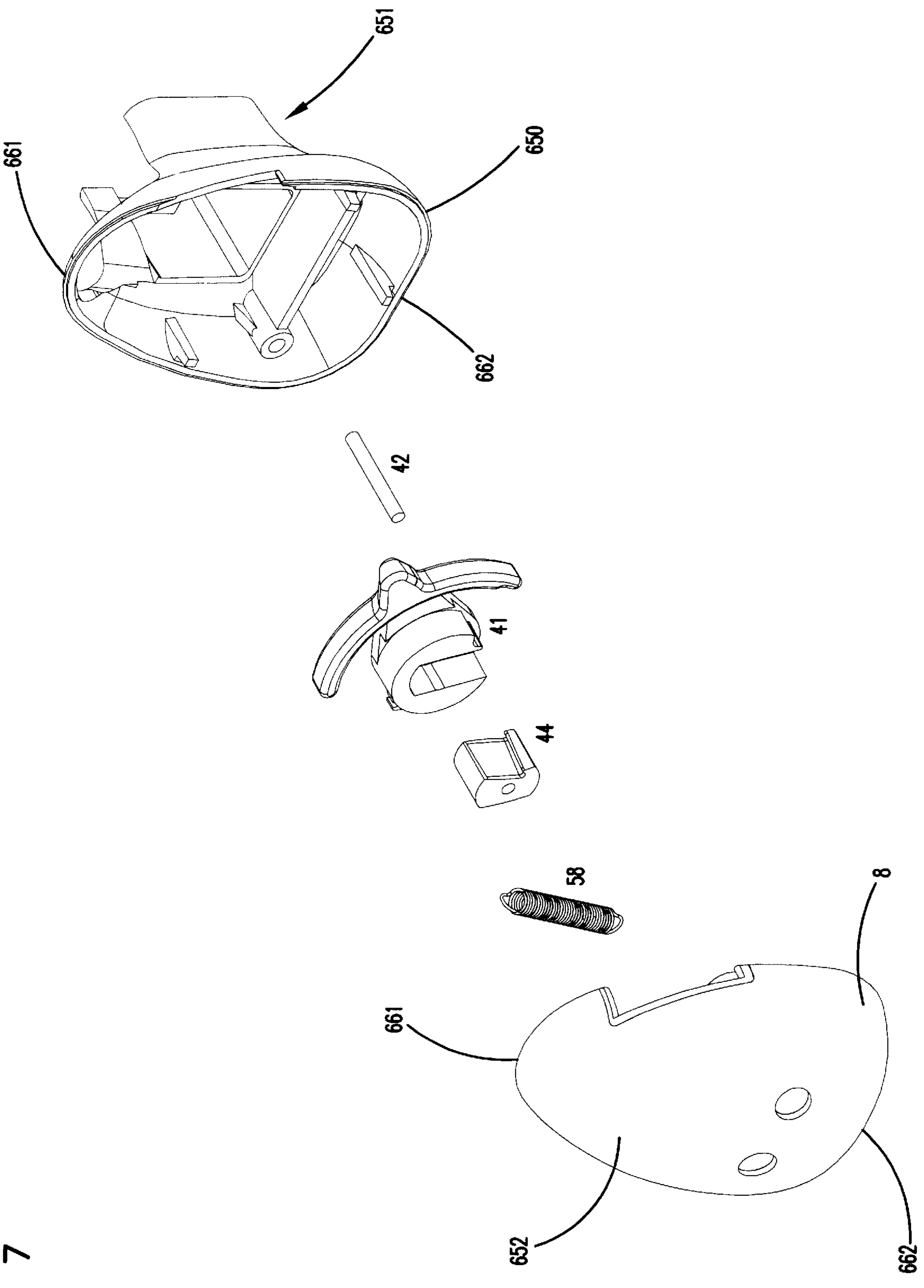
FIG. 7 illustrates an exploded view of a router handle comprising a switching system according to another example embodiment of the present invention.

As previously indicated, the first router switch 182 and trigger 25 combination is used both to engage and to lock out the operation of the router motor. FIG. 7 illustrates an exploded view of components of the switching system contained within a router handle according to one embodiment of the present invention, including a first router handle 11, a trigger 25 located on first handle 11, and a locking lever 41 located within the first handle.

Router handle 11 comprises an outer handle periphery 652 which itself has an outer circumference, 650. Trigger 25 is located on the first handle 11 and is configured to activate the router motor when depressed from an off position to an on position. As trigger 25 is moved to the on position, the trigger 25 moves into the first handle with the shape of the trigger conforming to the shape of a corresponding portion of the outer periphery 652 of the first handle 8.

Figure 8A:
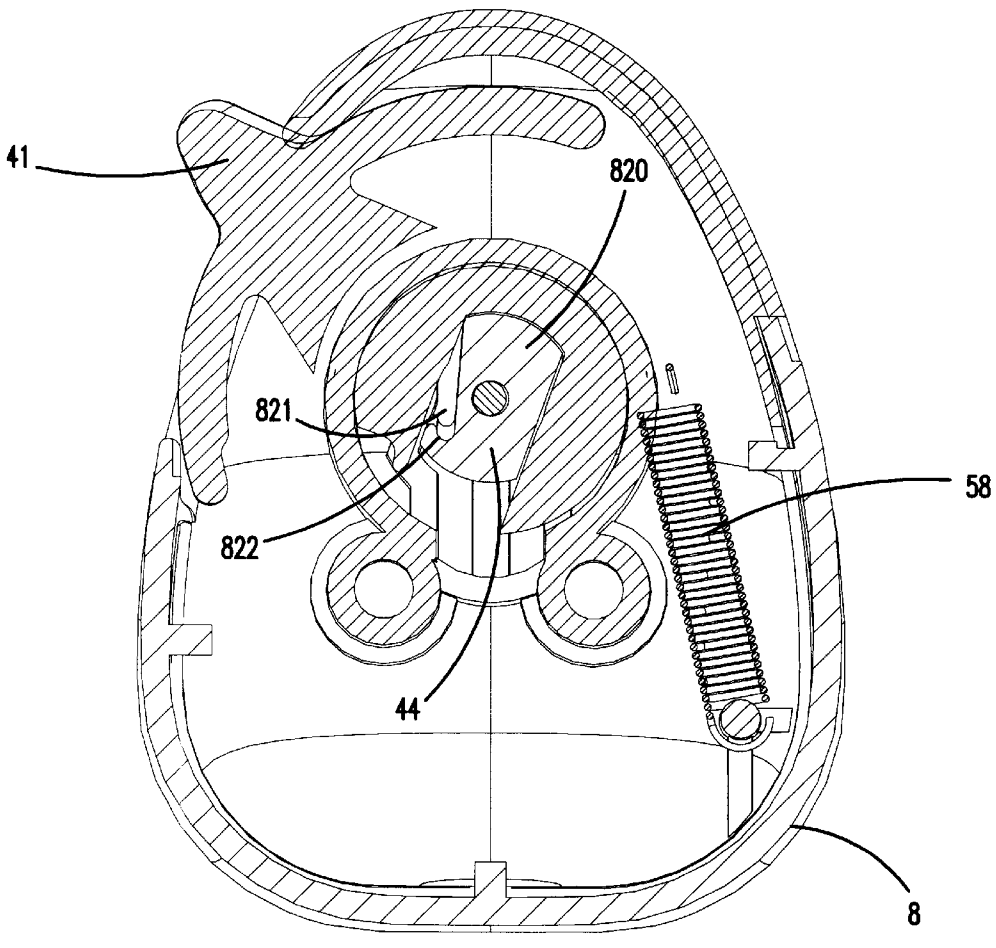
FIGS. 8A, 8B, 8C, and 8D illustrates the arrangement of components of a switching system within a router handle in a locked position according to one embodiment of the present invention.

Arm member 41 is located along a portion of the outer periphery of the first handle to permit locking lever 41 to be operated by the index finger of an operator. Arm member 41 moves about the outer periphery of the first handle from a locked to an unlocked position. Arm member 41 is shown in three different positions in FIGS. 8A, 8E, and 8I. Trigger 25 and locking lever 41 preferably are configured to operate together such that the trigger will not operate and move into first router handle 11 until locking lever 41 has been moved from the locked position (see FIG. 8A) to the unlocked position (see FIG. 8E). Trigger 25 preferably is located between the motor housing and the outer handle periphery 652 of the first handle 8 such that the trigger 25 can be operated by the thumb of an operator as the thumb squeezes the trigger 25 while gripping the first router handle 11. The operator can also move the locking lever 41 from the locked position (see FIG. 8A) to the unlocked position (see FIG. 8E) using the index finger of the same hand.

Figure 8B:
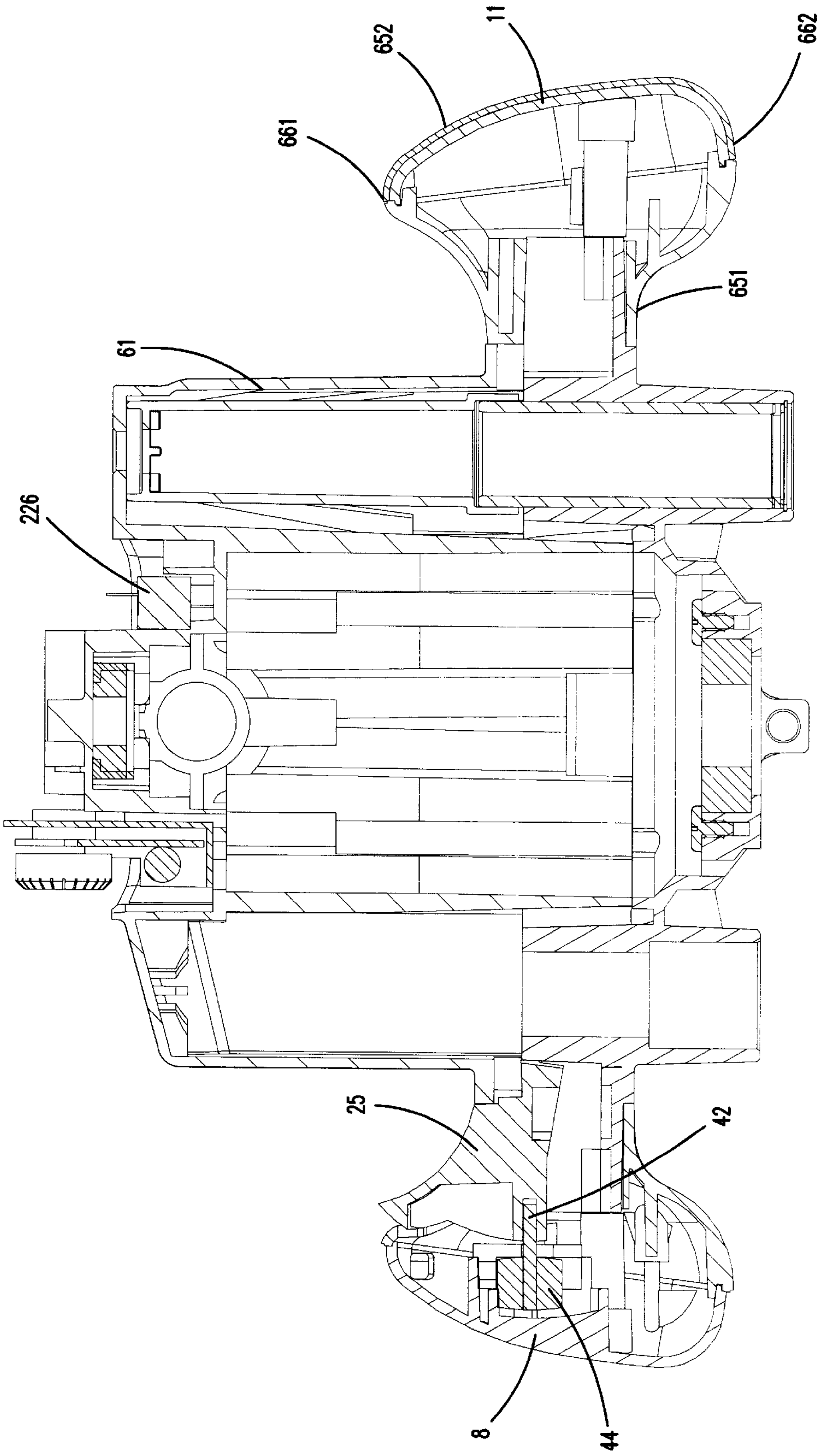
Figure 8C:
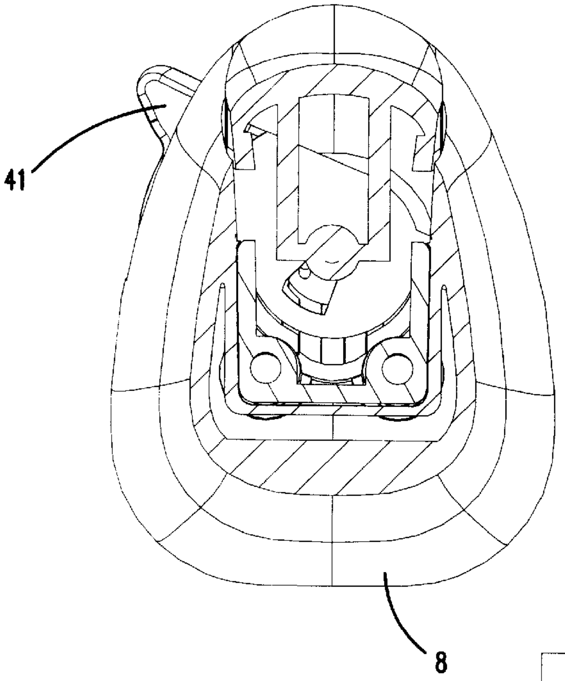
Figure 8D:
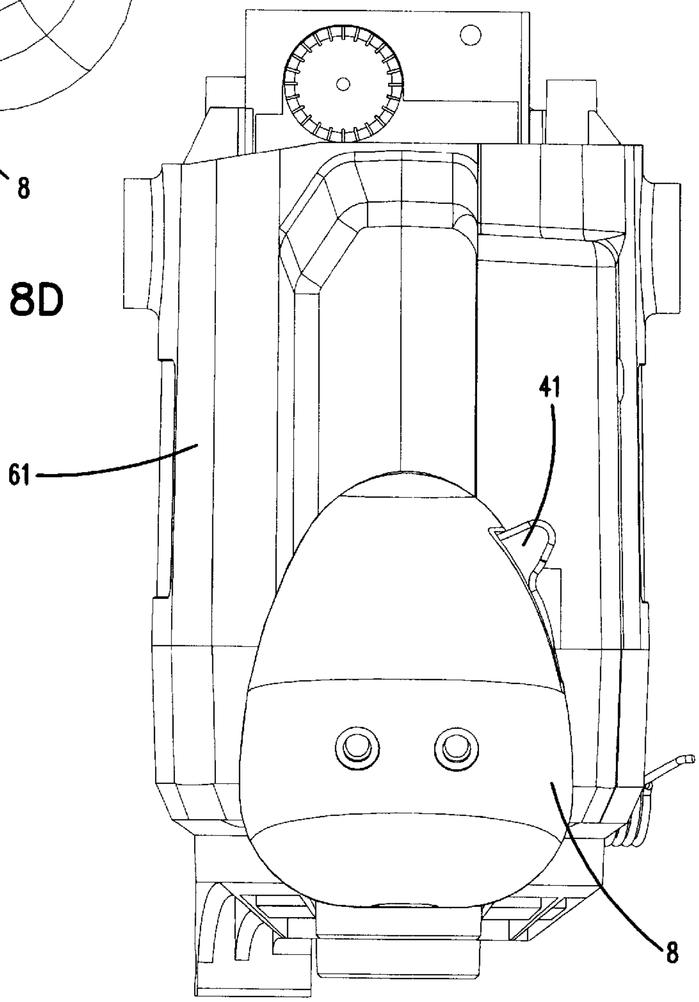
Figure 8I:
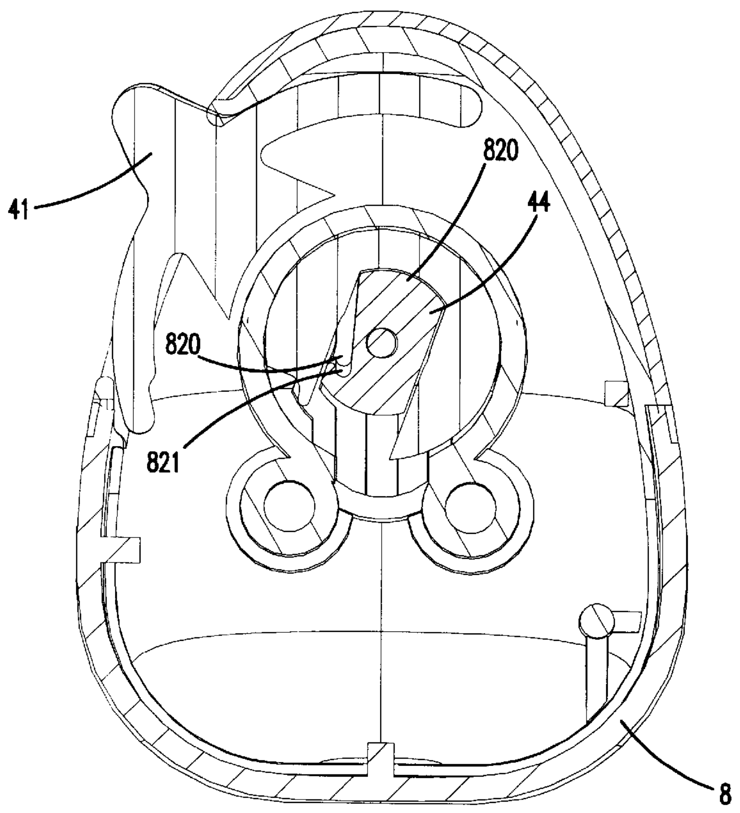
FIGS. 8I, 8J, and 8K illustrates the arrangement of components of a switching system within a router handle in a locked-on position according to one embodiment of the present invention.
Figure 8E:
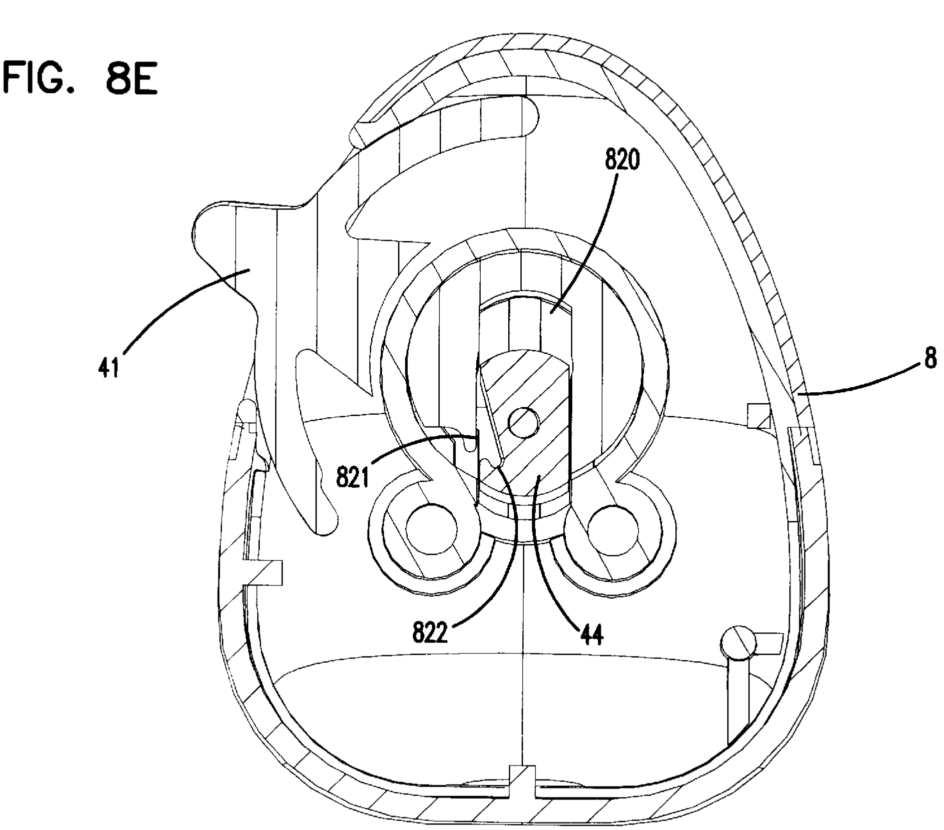
FIGS. 8E, 8F, 8G, and 8H illustrates the arrangement of components of a switching system within a router handle in an unlocked position according to one embodiment of the present invention.
Figure 8F:
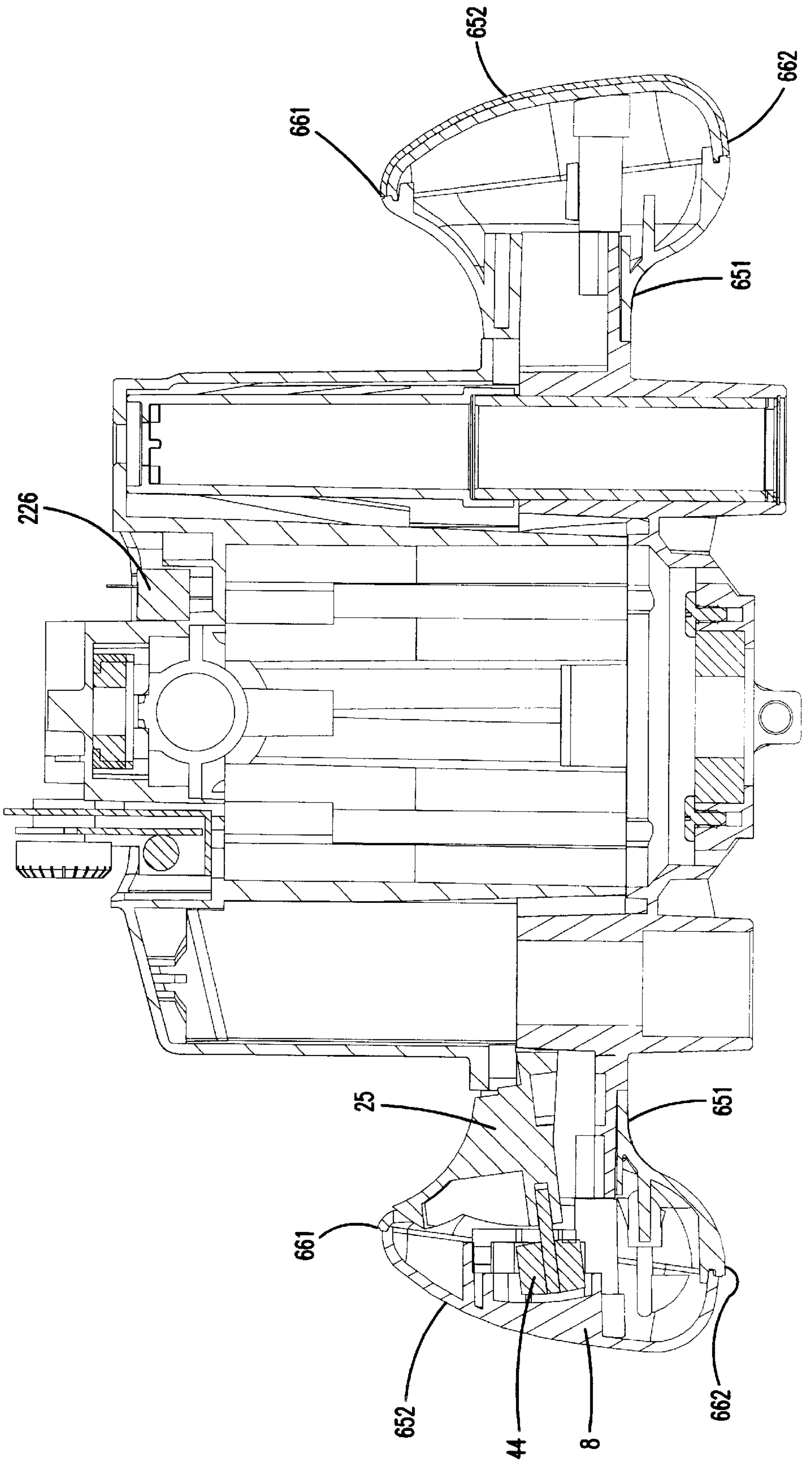
Figure 8G:
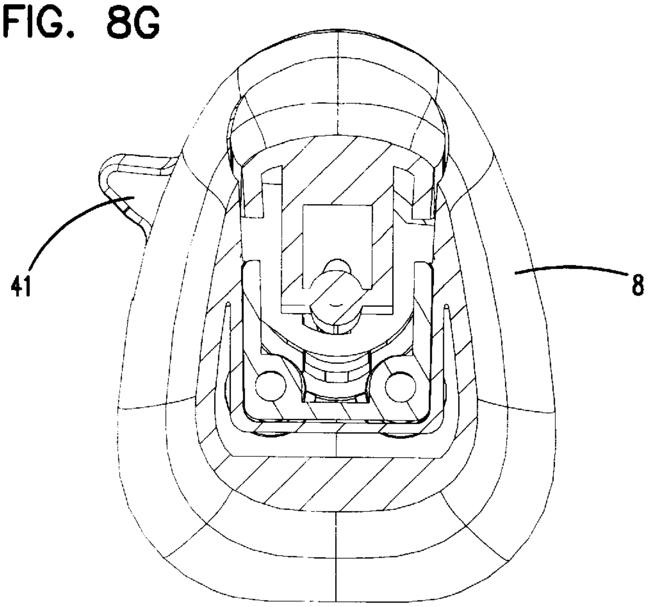
Figure 8H:
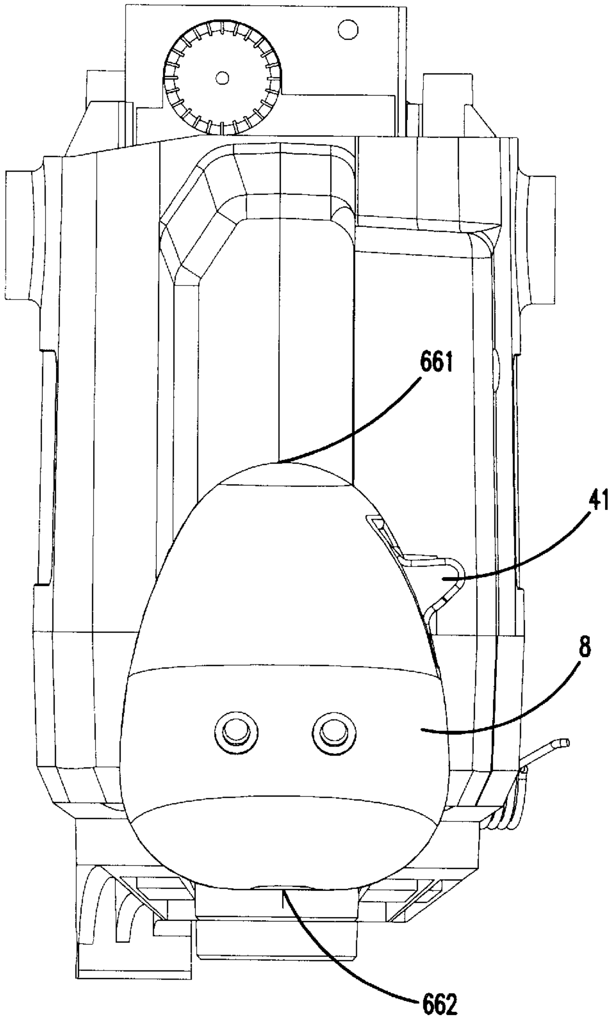
Figure 8J:
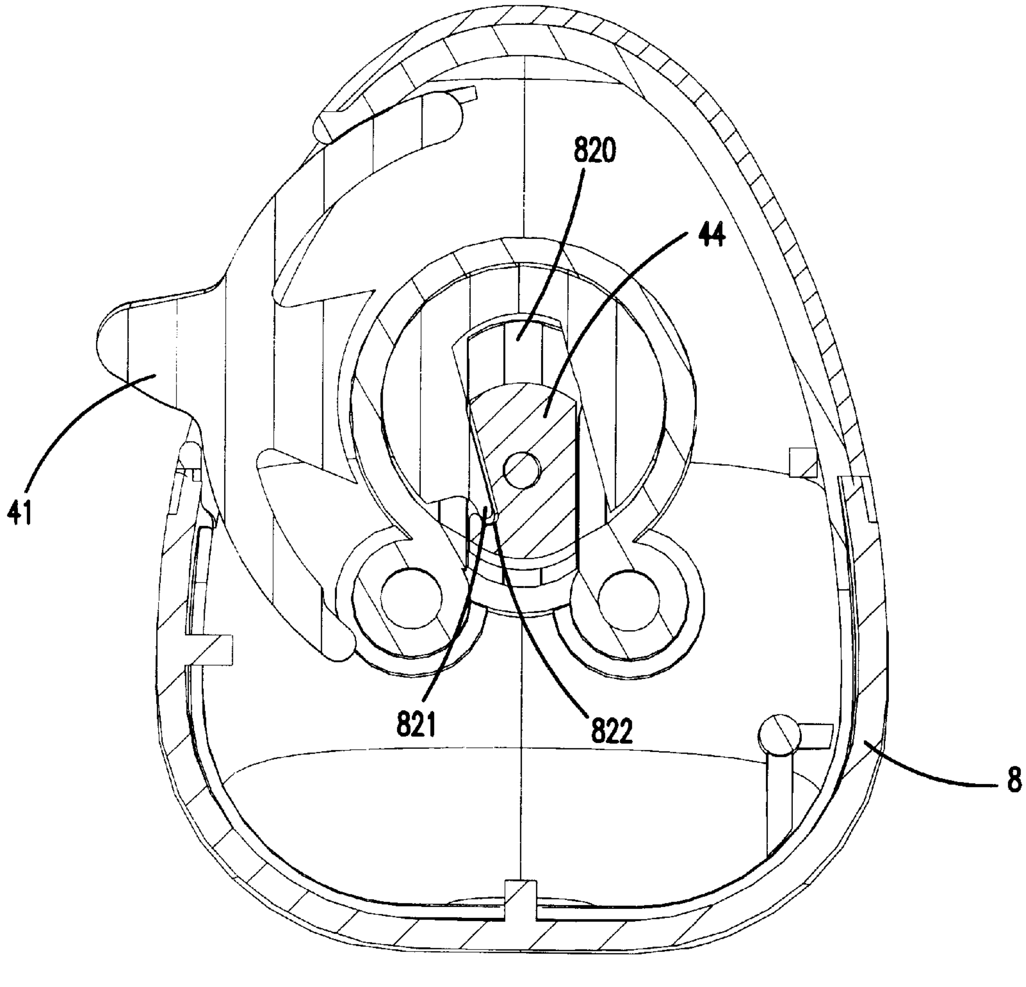
Figure 8K:
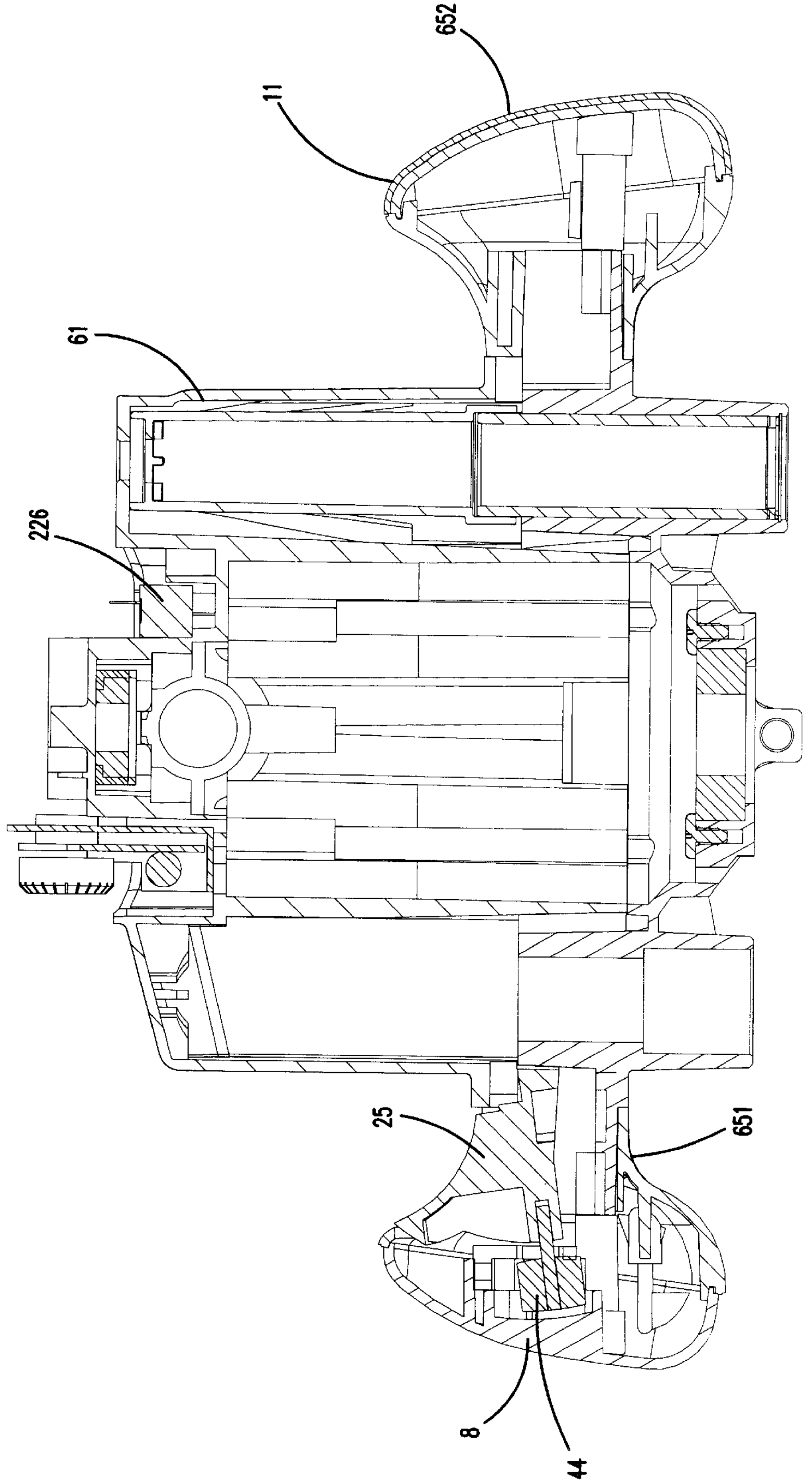

Trigger 25 may be coupled to a pair of electrical switches 182 within first router handle 11 such that the switch 1821 is depressed when the trigger 25 has moved from the off position (see FIG. 8B) to the on position (see FIG. 8F). During the operation of the router, electrical switch 182 is connected in a circuit with the router motor and an external electrical power source (such as from a wall outlet through a power cord) to operate the router motor. When electrical switch 1821 is depressed, contacts within the switch are closed to complete the electrical circuit between the motor and the power source see FIGS. 11A and 11B.

Locking lever 41 preferably is further configured to hold trigger 25 in the on position when the locking lever 41 is in a locked on position (see FIG. 8I). This locked on position is reached once the operator moves the trigger to the on position (see FIG. 8F) after moving the locking lever to the unlocked position (see FIG. 8E). The locked on configuration is shown in FIG. 8I. Locking lever 41 preferably is configured to hold the trigger in place until such time as the trigger is depressed again once the locking lever 41 has entered the locked on position.

To accomplish locked on operation, the locking system within the first router handle comprises a spring extension 58, a locking lug 44, and a lug axial member 42. The spring extension 58 is connected between a catch located on the locking lever and a post within the first router handle. Spring extension 58 provides a bias force to the locking lever 41, causing it to rotate from the locked to the unlocked position when not held by an operator. As shown in the Figures, locking lug 44 is located between the lug axle member 42 and locking lever 41 and is used to perform the lock on and lock off operations. Locking lever 41 defines a slot 820 about its center through which the locking lug 44 can slide. Locking lug 44 is shaped to mate with slot such that, when the slot of the locking lever aligns with the locking lug, the locking lug can travel through the slot. When the locking lever is in the locked position (see FIG. 8A) slot 820 is not aligned with the locking lug 44, and thus the locking lug 44 cannot slide through the slot. When the locking lever 41 has been moved by an operator to the unlocked position (see FIG. 8E) the slot 820 and locking lug 44 are aligned. The locking lug 44 is coupled to one end 251 of the trigger 25 such that the locking lug 44 will slide through the slot in the locking lever 41 once the trigger is depressed.

Figure 8L:
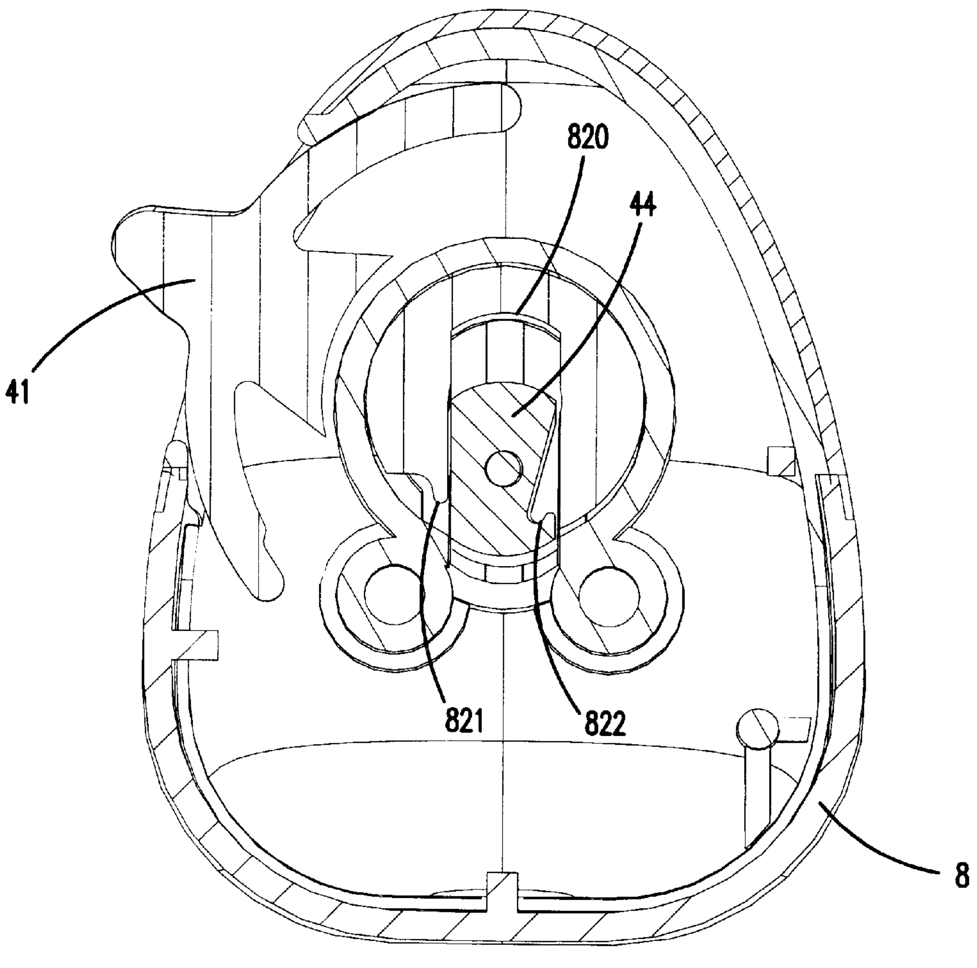
FIG. 8L illustrates an arrangement of the components of a switching system within a router handle when the locked-on position has been disabled according to one embodiment of the present invention.
Figure 8M:
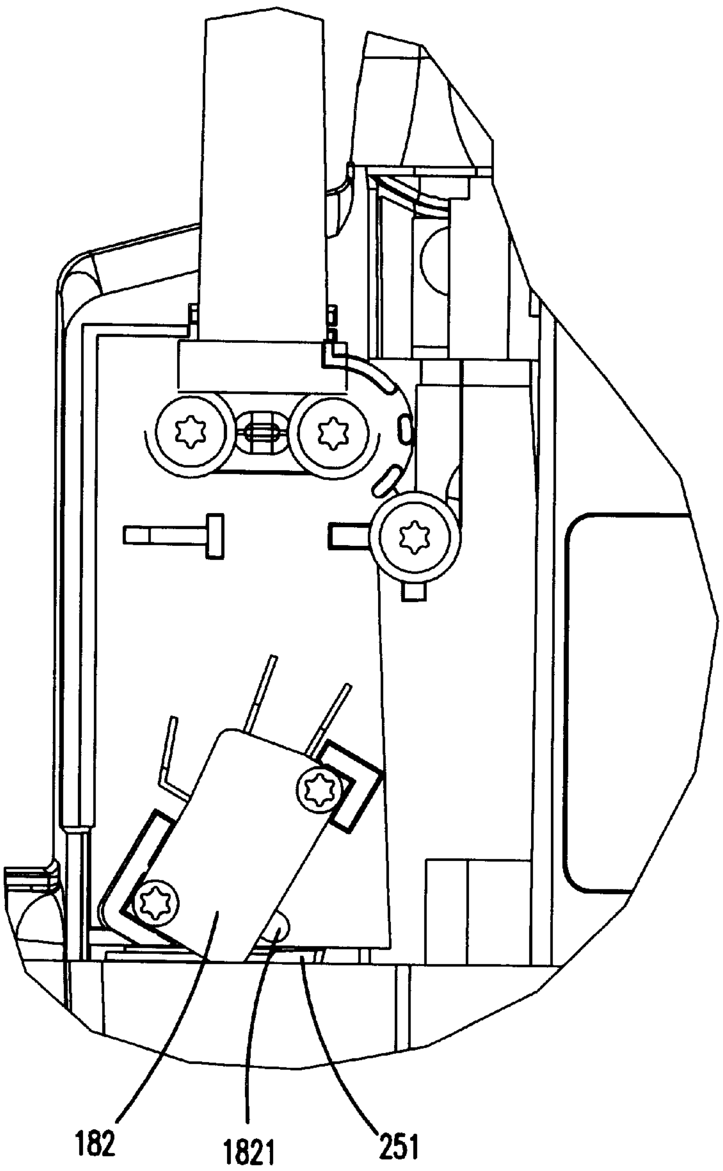
FIG. 8M illustrates a placement of a contact switch coupled to a trigger according to an example embodiment of the present invention.

The trigger 25 is locked out and cannot operate when the locking lever 41 is in the locked position because the locking lever 41 is in the path of motion for the locking lug 44 which needs to move if the trigger is to be depressed. Once the locking lever 41 is moved to the unlocked position, and thus the locking lug 44 aligns with the slot in the locking lever 44, the trigger can be depressed because the locking lug will now slide through slot in the locking lever 41. This combination of functions provides the locking out mechanism for the trigger because the trigger 25 only makes connections with the electrical switch 182 when fully depressed. As shown in FIG. 8M, switch 182 is located within the motor housing 61. Trigger 25 is coupled to contact 1821 on one side of switch 182 such that contact 1821 is depressed when trigger 25 is depressed. Contact 1821 causes the electrical switch 182 to close and complete the electrical circuit between the router motor and an external power source. With respect to trigger 25, this combination of components controls the electrical operation of the router motor.

The locking lug 44 and locking lever 41 preferably are further configured to have a finger 821 and catch 822 combination so that they can engage each other once the locking lug 44 has moved sufficiently through the slot 820 in the locking lug. When the finger 821 and catch 822 combination engage, as shown in FIG. 8B, the locking lug is held in place. With the locking lug 44 stationary, part of lug 44 remains in the slot 820 within the locking lever 41, thus preventing it from rotating against the biased force of the extension spring 58. Locking lug 44, also being coupled to the trigger 25, holds the trigger 25 in place. This combination of components when in a particular position, as shown in FIG. 8E, therefore creates a locked on position as the trigger 25 will remain stationary in its on position. Because the trigger 25 depresses the electrical switch 1102 when the trigger 25 is in the on position, locking the trigger in its on position causes the trigger 25 to continually depress the electrical switch 1102 which energizes the router motor.

When the locking lug 44 and locking lever 41 combination are located in this locked on position and the trigger 25 is depressed, the finger coupling combination of the locking lug 44 and locking lever 41 disengage and thus permit the locking lug 44 and trigger to slide back through the slot 820 within the locking lever 41. The biased force from the spring extension 58 causes the locking lever 41 to rotate back to the locked position. This combination of components operating in this manner perform the disengagement of the locked on operation. The locking lug 44 is configured such that it can be assembled in a configuration where the lug is rotated 180° about its vertical axis and placed on the lug axle such that the finger element protrudes in the opposite direction when the lug is inserted within the slot 820 of the locking lever 41 (see FIG. 8L). When the components are assembled in this combination, the finger 821 element of the locking lug will not be engaged to catch 822 on the locking lever 41, thus eliminating the locked on operation of the locking system, should the locked on feature not be desired.

While the preferred embodiment shown in FIGS. 1–8, illustrate a plunge router, the router trigger switching system will operate on any type of router or similar cutting device which possess at least one handle.

Router Chuck Mounting System

Figure 9:
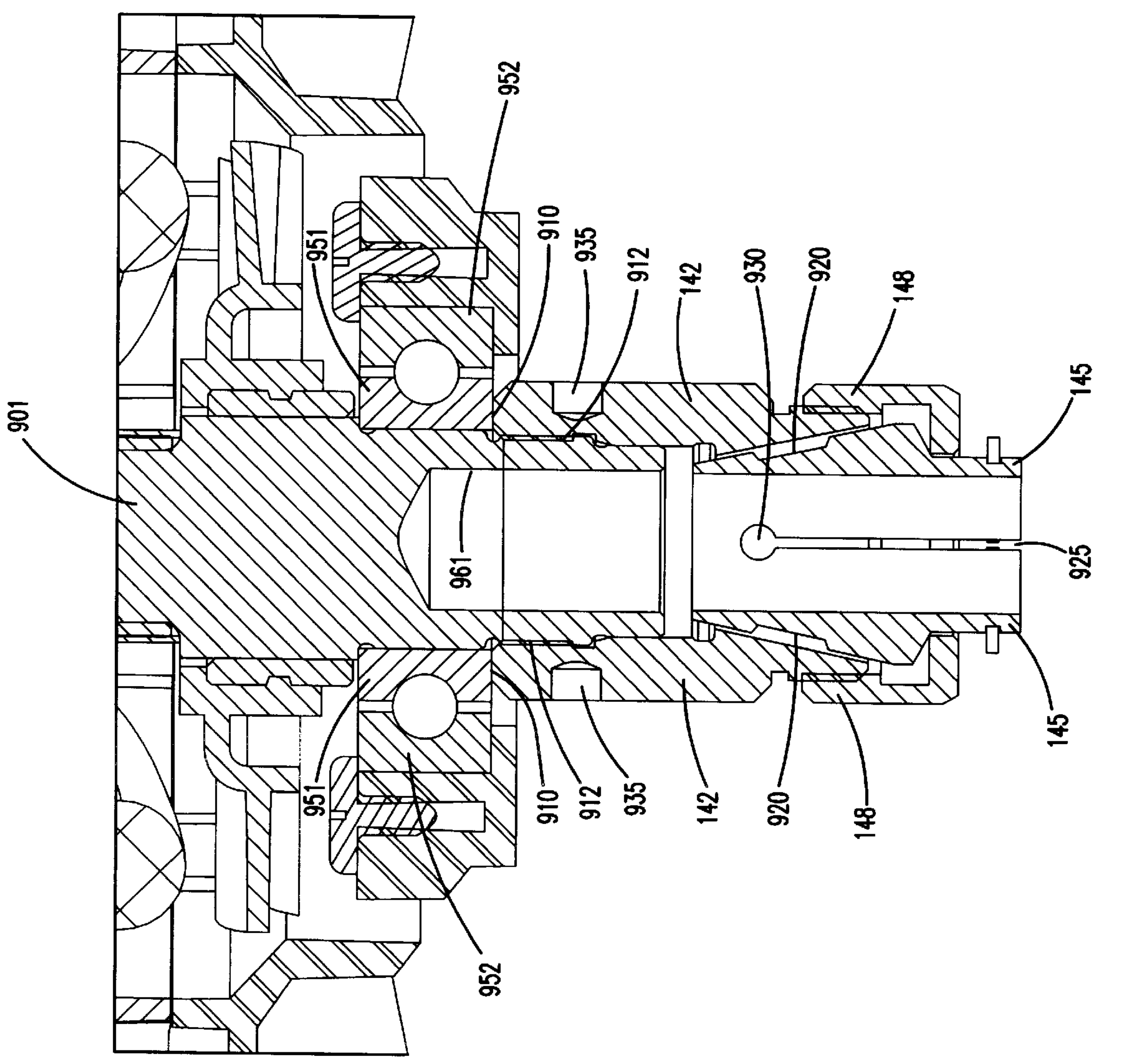
FIG. 9 illustrates a chuck and collet alignment system coupled to an armature shaft of a router motor according to another embodiment of the present invention.

In the preferred embodiment, the router comprises a chuck and collet mounting system for mounting the chuck and collet on one end of an armature shaft of the router motor for attaching a cutting tool to the router. A preferred chuck and collet mounting system are shown in FIG. 9. The router shown comprises a motor having an armature shaft 901 which extends through the bottom of a motor housing 61. The router also comprises a router base 1 coupled to the motor housing 61 to support the motor above the base at various heights.

The preferred chuck mounting system is coupled to the lower end of the armature shaft 901 and comprises a detachable collet 145 and collet nut 148. Chuck 142 is mechanically coupled to the armature shaft 901 and to a lower router bearing 902. Bearing 902 has both an inner race 951 and outer race 952. The lower router bearing is configured to receive the armature shaft 901 within its inner race, and outer race of the lower router bearing is secured by the motor housing to permit the armature shaft and inner race to rotate within the housing. An upper router bearing 28 is located above lower router bearing 902 to accept and support the upper end of the armature shaft. The upper and lower router bearings may be of conventional design and any number of possible upper and lower router bearing designs and location combinations can be used with to the present invention.

Chuck 142 defines a vertical lengthwise hole 920 having a series of varying inner diameters and has a lower end is configured accept the collet and router bit shank for installation within the chuck and thus the router. Chuck 142 also has a top face 955 proximate the upper end of the chuck. The armature shaft 901 also defines a vertical lengthwise hole 961 in a bottom portion of the armature shaft 901 and is configured to align with a vertical lengthwise hole within the chuck 142 to permit the router bit shank to pass through the hole within the chuck 142 and move upwards into the hole within the armature shaft 901 itself.

According to one particular embodiment of the present invention, the top face of the chuck 142 engages a lower surface 910 of the inner race 951 of lower router bearing 902 in order to square the chuck 142 with the motor housing. The inner diameter of the chuck 142, along a portion near its top face 955, engages a portion of an outer diameter 911 of the armature shaft 901, along a corresponding portion near its lower end, in order to align the chuck with the armature shaft 901 along a portion of the chuck running from the top face and extending along a portion of the vertical lengthwise hole within the chuck. In one particular embodiment of the present invention, the outer diameter surface of the armature shaft is threaded 912 as is the surface of the upper portion of the vertical lengthwise hole within the chuck such that these threads mate to hold the chuck in place on the end of the armature shaft.

The lengthwise hole through the chuck 142 possesses a tapered hole having an initial diameter which widens from its initial value at the mating point between the armature shaft 901 and the chuck 142 to allow the chuck to accept a tapered shaped collet 145. The tapered hole is located along a lower portion of lengthwise hole through the chuck 142 which begins after a point where the armature shaft and chucks mating surfaces end. The collet will fit within this widening hole 920.

According to one particular embodiment, the collet defines a lengthwise hole 930 through its center to accept the router bit shank and has an outer surface which is sloped from a minimum diameter at its top toward a maximum diameter near its bottom such that the outer shape of the collet mates with the inner shape of the lower portion of the lengthwise vertical hole within the chuck. The collet also has the plurality of lengthwise slots 925 used to permit the inner diameter of the collet 145 to be narrowed as the collet nut 148 is tightened on the chuck 142. In the embodiment shown, the router bit shank passes through lengthwise hole 930 within the collet 145 and up into the hole within the armature shaft 901. A collet nut 148 tightens about the router bit shank to hold it in place.

Collet nut 148 is located about the lower end of the collet 145 and has a threaded inner diameter surface 931. The treaded inner diameter surface 931 is sized to mate with the outer diameter surface of the chuck 142 about its lower end such that the collet nut 148 can be threaded onto the bottom of the chuck 142. As the collet nut 148 is threaded up onto the chuck, the nut moves up the outer sides of the collet compressing inward, causing the collet to move against itself about the plurality of slots thus tightening the collet about the shank of a router bit.

In one embodiment, the chuck and collet combination is a wrench operated collet requiring the use of two wrenches (not shown) to tighten the collet nut. According to another embodiment, the chuck and collet mounting system comprises a cylindrical locking pin 2 located perpendicular to chuck 142 within a support structure to permit the collet nut 148 to be tightened using only a single wrench. Cylindrical locking pin 2 has a lock and unlock position within the support structure. When in the locked position, the pin 2 slides inward toward the outside of chuck 142 which defines a plurality of mating holes 935 sized to accept the cylindrical locking pin. When the locking pin is held in place within one of the mating holes, the chuck 142 cannot rotate. An operator can hold the pin 2 in its locked position within one of the holes 935 in the chuck 142 while the other hand uses a wrench to move the collet nut 148 and thus tighten or loosen the collet nut. In the preferred embodiment, cylindrical locking pin 2 includes a spring operated bias system 3 within the support structure to pull the cylindrical locking pin 2 away from the chuck 142. The bias system keeps the cylindrical pin 2 away from the chuck 142 when an operator is not pressing against the outward end of the cylindrical locking pin 2.

Plunge Router Locking System

In another embodiment of the present invention, a plunge router comprises a plunge locking system used to hold the router motor and its housing above the router base. The present plunge router comprises a router motor located within a motor housing 61 and a router base 1 which is coupled to at least a first plunge guide post 7. The first guide post is configured to support the motor housing 61 and thus the router motor at a plurality of selectable heights above the router base. The plunge locking system is configured to provide the operator with a locking mechanism to easily adjust the height of the motor housing above the router base.

In the embodiment shown, the plunge locking system comprises a threaded coupler member 91, a lock and lever arm 103, a brass plug 97, a torsion spring 46, and a mating catch device 1001. In its basic operation, the lock arm lever 103 is coupled to one end of the threaded coupler member 91. The lock arm lever 103 is coupled to the motor housing 61 using a pair of threaded mating surfaces on the lock arm lever 103 and a through hole 1004 defined within the motor housing 61. The threaded mating system is organized such that, as the lock arm lever 103 rotates, the lock arm lever 103 moves inward toward the motor housing 61. Because the lock arm lever is coupled to the outer end of the threaded coupler member 91, threaded coupler member 91 moves inward into the motor housing 61.

The motor housing is configured to surround at least a first guide post 7 so that the motor housing 61 can slide up and down on the guide post 7. The first guide post 7 is located within the motor housing 61 at a location such that the threaded coupler member 91 engages the guide post when in its inward locked position. The friction between threaded coupler member 91 and the first plunge guide post 7 prevents the threaded member 91 from moving upward or downward. Because the treaded member 91 is coupled to the locking lever 103, which itself is coupled to the motor housing, the motor housing 61 is held at the height set when the locking lever 103 is moved to cause the treaded member 91 to engage the plunge guide post 7.

In one particular embodiment of the present invention, a brass plug 97 is located at the inward end of the threaded coupler member 91 such that the brass plug 97, and not the threaded coupler member 91, engages the first guide post 7 when the locking system is engaged. The brass plug 97 may be used to provide a softer metal material than the steel typically used for the plunge guide posts 7 so that the engagement of the plug 97 and the guide post 7 does not scar or mar the surfaces of the guide post 7. As the lock arm lever 103 is being rotated between the locked and unlocked positions, the threaded coupler member 91 is correspondingly moving inward and outward such that it will engage or not engage the plunge rod 7 to hold the motor housing 61 at a fixed point above the router base 1.

In its operation, the lock arm lever 103 has two positions, a locked and an unlocked position. At the unlocked position, the lock arm lever may be held in place either by an operator holding the lever or by coupling the lock arm lever to a mating catch device 1001 located on the motor housing 61. The use of the mating catch device 1001 to hold the lock arm lever in the unlocked position effectively disables the plunge lock.

Figure 10A:
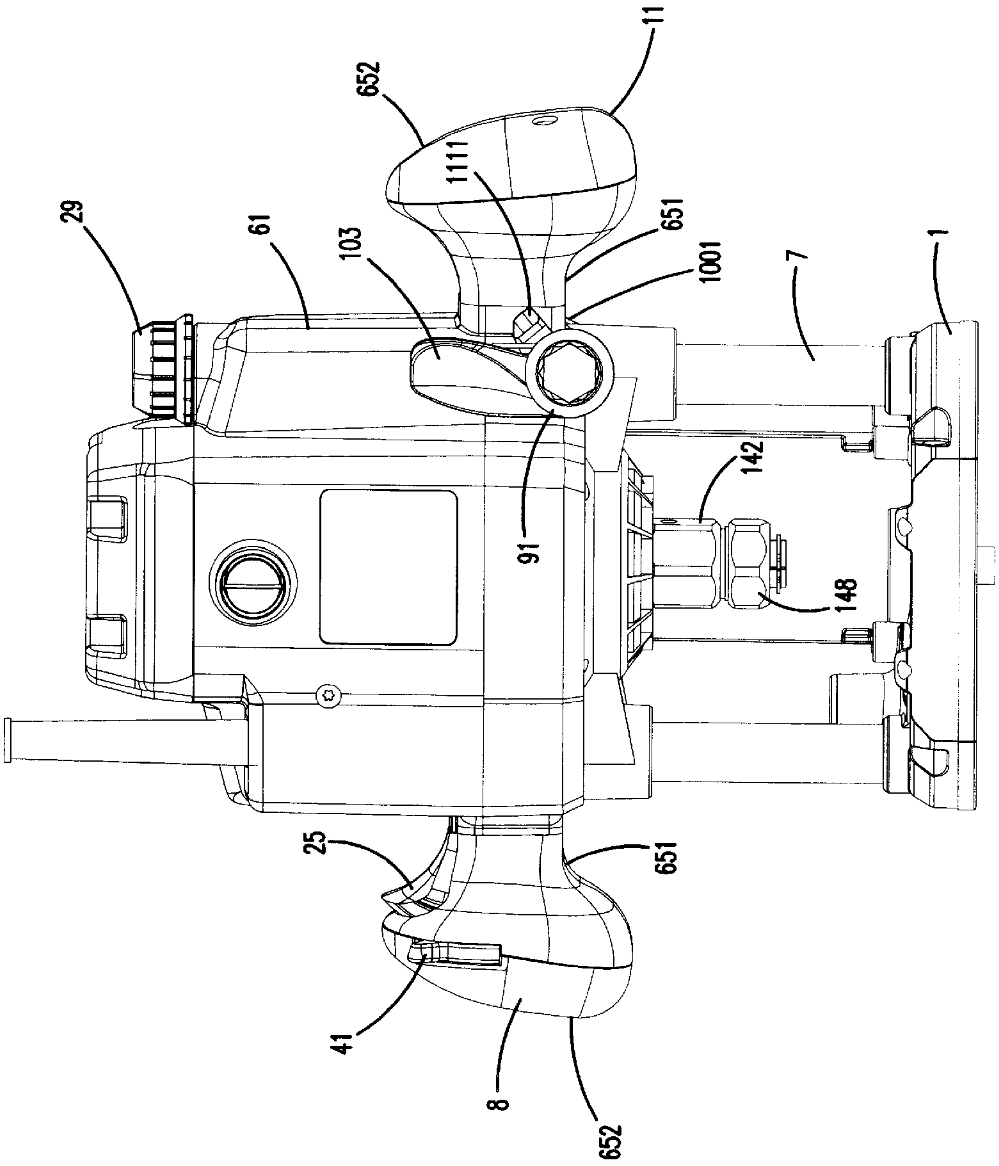
FIGS. 10A and B illustrate a plunge locking system in a unlocked position according to an example embodiment of the present invention.
Figure 10B:
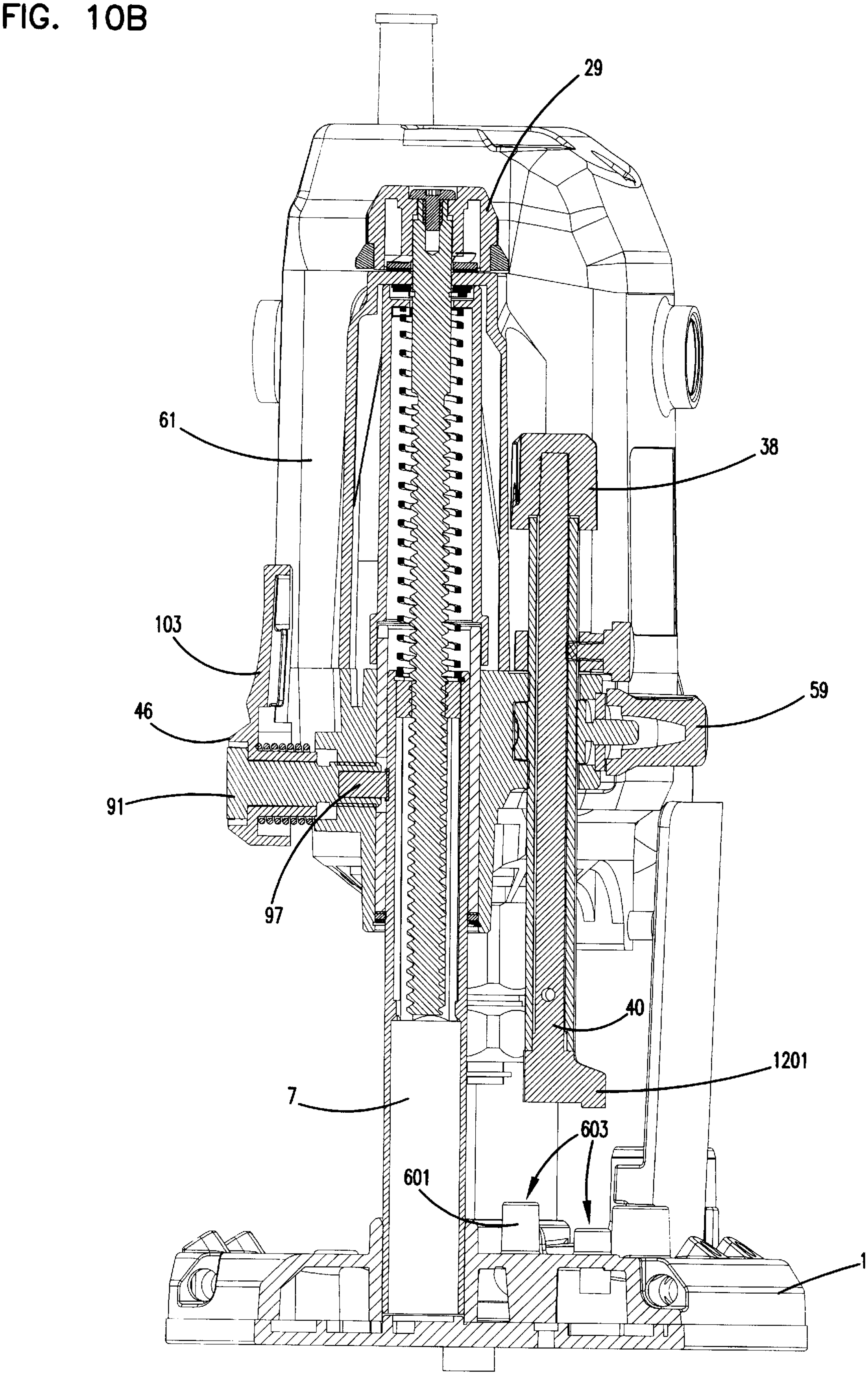
FIGS. 10C and D illustrate a plunge locking system in a locked position according to an example embodiment of the present invention.
Figure 10C:
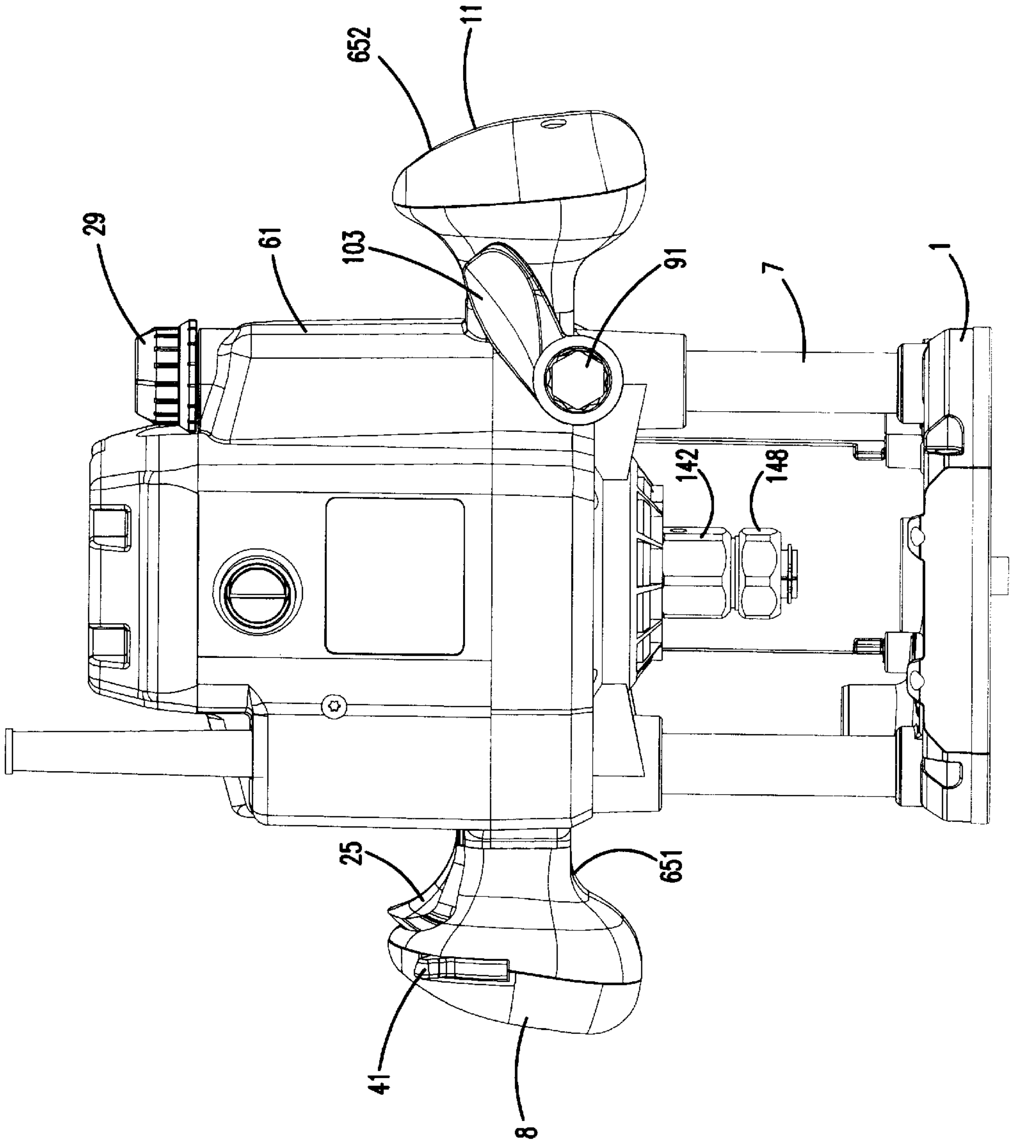
Figure 10D:
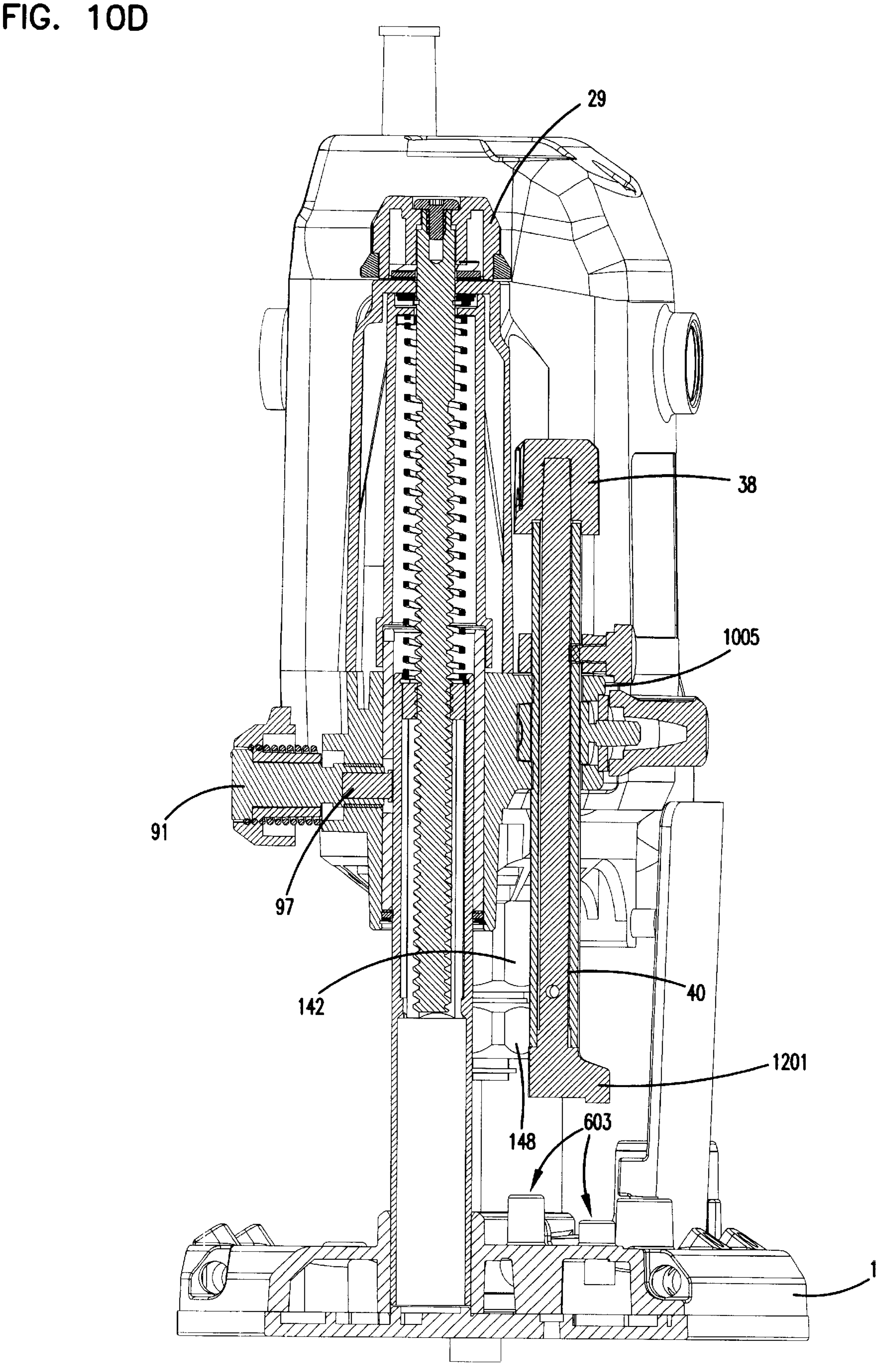

In its unlocked position (see FIGS. 10C and 10D) the lock arm lever 103 has rotated such that the threaded coupler member has pulled away from the plunge guide post, and the motor housing is free to slide up and down on the plunge guide post. When the lock arm lever is in the locked position (see FIGS. 10A and 10B) the lock arm lever 103 has rotated such that the threaded coupler member (and its brass plug, if included) have moved inward, engaging the outer surface of the plunge guide post and holding the assembly in place.

The preferred plunge locking system also comprises a torsion spring 46 which comprises a catch rod 463 proximate one end of the spring and a support rod 462 proximate the other end of the spring. Torsion spring 46 originally is located about the threaded coupler member 91 adjacent to the lock arm lever 103. In the preferred embodiment, the catch rod 463 which extends outwardly from the coiled torsion spring 46, is coupled to the back side of the lock arm lever 103 such that the catch rod 463 rotates with the movement of the lock arm lever 103. The support rod 462, which also extends outward from the coiled torsion spring 46, engages one side of the mating catch device 1001 which extends outward from the side of the motor housing 61.

The mating catch device 1001, according to a preferred embodiment to the present invention, contains a V-shaped notch 1111 proximate its outward end to accept the catch rod 463 when the lock arm lever 103 is moved into the unlocked position. As the lock arm lever 103 rotates between the locked and unlocked position, the catch rod 463 located along the back side of the lock arm lever 103 moves above the mating catch device 1001. Because the catch rod 463 runs parallel from the lock arm lever 103, it is slightly below the back surface of the lock arm lever 103. The mating catch device 1001 is located along a point of rotation for the lock arm lever 103 such that the catch rod 463 will be centered above the V-shaped notch 1111 in the outward end of the mating catch device 1001. Because the outward end of the catch rod 463 is coupled to the back surface of the lock lever 103, the catch rod 463 will hold the lock arm lever 103 in place in the unlocked position when the catch rod 463 is located within the V-shaped notch 1111 of the mating catch device 1001.

In operation, the operator rotates the lock arm lever 103 from the locked to unlocked position. At that time, that catch rod 463 will be centered within the V-shaped notch 1111, and the lock arm lever 103 can be held from rotating back by the V-shaped notch 1111. When an operator wants to move the lock arm lever 103 back to the locked position, the operator applies sufficient force to the lock arm lever 103, and thus in turn to the catch rod 463, to overcome the friction between the V-shaped notch 1111 and the catch rod 463. The operator forces the catch rod 463 over the edge of the V-shaped notch 1111 in order to permit the lock arm lever 103 to rotate back to the locked position using the bias force created within the torsion spring 46.

Mating catch device 1001 preferably is located adjacent to the mating point between the lock arm lever 103 and the motor housing 61 such that the support rod 462 will not rotate when the lock arm lever 103 moves between the locked and unlocked position. Because the support arm is coupled to the side of the mating catch device 1001, the rotational force within the torsion spring 46 is created when the lock arm lever 103 moves from the locked to unlocked position. Accordingly, torsion spring 46 creates a bias force against the movement of the lock arm lever 103 when the lock arm lever 103 is not in the locked position.

Switchable Router Brake System

In another embodiment, the router also comprises a switchable motor brake system for controlling the operation of the router motor 136. The preferred switchable motor brake system comprises the circuit shown in the diagram of FIG. 11B. In such an embodiment, the router comprises a router motor surrounded by a motor housing 61, the motor brake system, and a brake control switch 226 which is used to engage or disengage the motor brake system. The motor brake system may comprise a load resister 1103 placed across a set of windings 1104 of the router motor. Load resister 1103 operates to bleed off electrical current contained within the motor when the motor control switch 1102 is switched to an off position. Brake control switch 226 is electrically connected to the motor brake load resistor 1103 such that the motor brake resistor 1103 is electrically disconnected from the router motor windings when the brake control switch 226 is in a first position. The brake control switch 226 will connect the load resistor 1103 to the router motor windings 1104 when it is in a second position. In one such embodiment, the brake control switch 226 shown in the circuit of FIG. 11B is a toggle switch 226 mounted on motor housing 61.

When the load resistor 1103 is placed across the router motor windings 1104, the router motor will stop rotating almost immediately after the router motor is turned off using a motor control switch 182. When the brake control switch 226 is in the first position, and the load resistor 1103 is not placed across the windings 1104, the router motor will continue to spin down slowly after the motor control switch 182 is moved from the on to off position. The feature of disengaging the router motor brake allows the operator to have finer control of the operation of the router, since application of the load resistor across the router windings can cause the router motor to jerk slightly do to the rotationally-induced braking torque. When the router brake load resistor is not placed across the motor windings, the torque induced jerk effect does not occur. By disengaging the motor brake system, the user can have finer control over the operation of the router when doing delicate cutting work.

Plunge Router Depth Stop System

Figure 12:
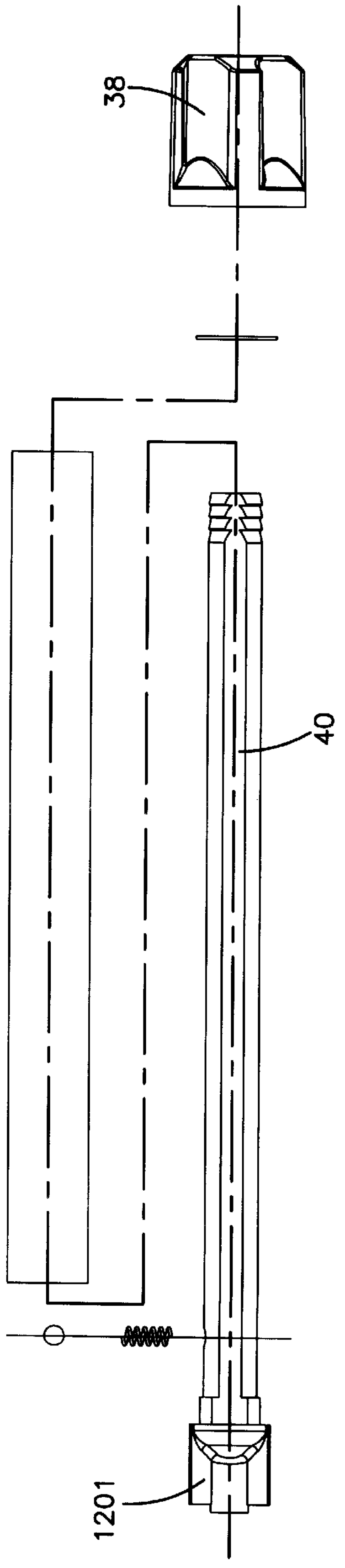
FIG. 12 illustrates a depth stop rod which is part of a plunge depth stop system according to another embodiment of the present invention.

According to an example embodiment of the present invention, a plunge router may also comprise an improved adjustable bit depth stop system. As described before, the present router comprises a router motor which is surrounded by a motor housing 61 and which is supported above a router base 1 using at least one plunge guide post 7. The plunge guide post 7 is coupled to the router base 1 at one end and is configured to support the motor housing 61 at a plurality of selectable depth stop positions above the router base. The preferred plunge router depth stop system, shown in part in FIG. 12, comprises a rotatable depth stop rod 40 which has a selection member protrusion portion 1201 protruding from the depth stop rod proximate one end. The depth stop rod 40 is located within a restraining collar 1004 affixed to one side of motor housing 61.

The adjustable depth stop system also comprises a step-wise rising depth stop 601 having a plurality of stop position surfaces 603 located on the router base 1. The step-wise rising depth stop 601 is configured to engage the selection member protrusion portion 1201 of the depth stop rod 40 to stop the plunge router at a desired depth.

Restraining collar 1004, which is affixed to the motor housing 61, comprises an adjustable restraining device 1005 to hold the depth stop rod 40 at a desired selectable height as well as to permit the depth stop rod to rotate at the desired selected height in order to enable the selection protrusion member of the depth stop rod to engage a selected one of a plurality of stop positions within the rising depth stop 601. The selection member protrusion portion 1201 of the depth stop rod 40 engages any one of these plurality of stop position surfaces 603 when the rotatable depth stop rod 40 is rotated to a position in which the depth stop rod selection protrusion portion 1201 is vertically aligned above the selected one of the plurality of depth stop position surfaces 603 located on the step-wise rising depth stop 601.

The depth stop rod 40 itself is configured to slide vertically within the restraining collar 1004 in order to enable the desired depth stop height to be set to a plurality of heights under the control of the adjustable restraining device 1005. In operation, the selection protrusion member 1201 of depth stop rod 40 is aligned above one of the plurality of depth stop position surfaces 601 and is held at the height desired when the restraining collar is tightened. As the motor housing 61 is lowered on the plunge guide posts 7 toward the router base 1, the selection member protrusion portion 1201 engages the selected one of the plurality of stop position surfaces 603 when the motor housing has reached the desired height, thus preventing the motor housing and corresponding router bit from plunging any deeper into the material being cut.

The adjustable restraining collar 1004 is also configured to hold the depth stop rod 40 within the restraining collar at the desired height while also preventing the depth stop rod from rotating within the collar without the application of a rotational force by an operator. Because the selected one of the plurality of depth stop positions surfaces 603 are at various heights above the router base, an operator can set the depth stop rod at a desired height and rotate the rod 40 to one of the selected plurality of depth stop surfaces 603 having the desired separation from the router base 1. The operator can then plunge the router to cut into the work piece material to the height set by the combination of the depth stop rod 40 at a height and the particular selected one of the plurality of depth stop position surfaces 603. Once the operator has completed the cut at this height, the operator can simply rotate the depth stop rod 40 within the restraining collar 1004, while maintaining the height setting of the depth stop rod 40, such that the selection member protrusion portion 1201 of the depth stop rod 40 engages a different one of the plurality of depth stop position surfaces 603. Restraining collar 1004 is configured to hold the depth stop rod 40 in place. Restraining collar 1004 is also configured to permit the depth stop rod 40 to rotate at a set height when an operator applies a rotational force to a turret knob 38 coupled to one end of the depth stop rod 40. Because the second stop position surfaces have different heights from the router base, the plunge router can be plunged to a different position for successive cuts. Assuming that the operator first selects the highest depth stop position surface 603, this process can be repeated for as many of the depth stop position surfaces as exist within the step-wise rising depth stop 601 located on the router base 1.

Figure 1:
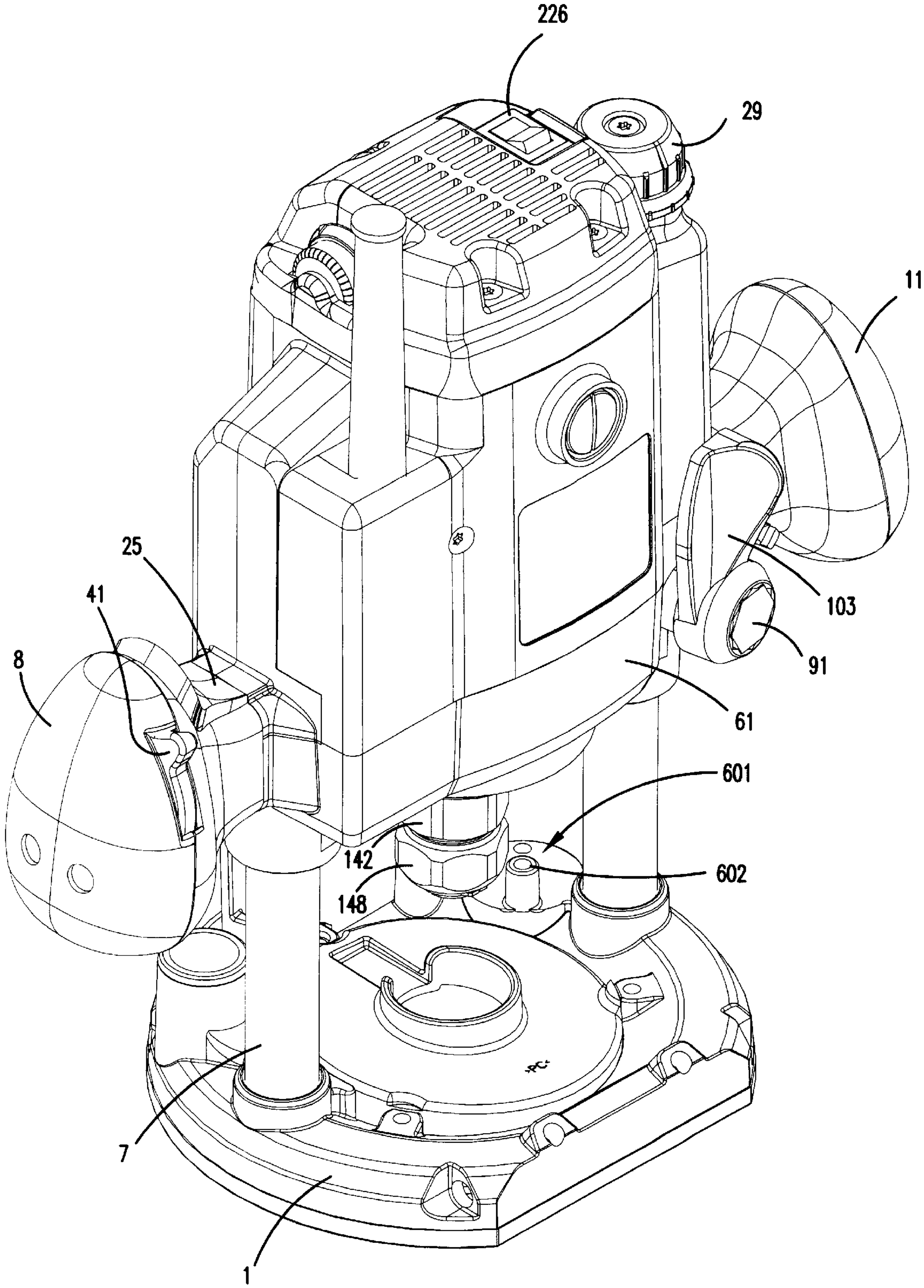
FIG. 1 illustrates a perspective view of a plunge router which incorporates the present invention.
Figure 2:
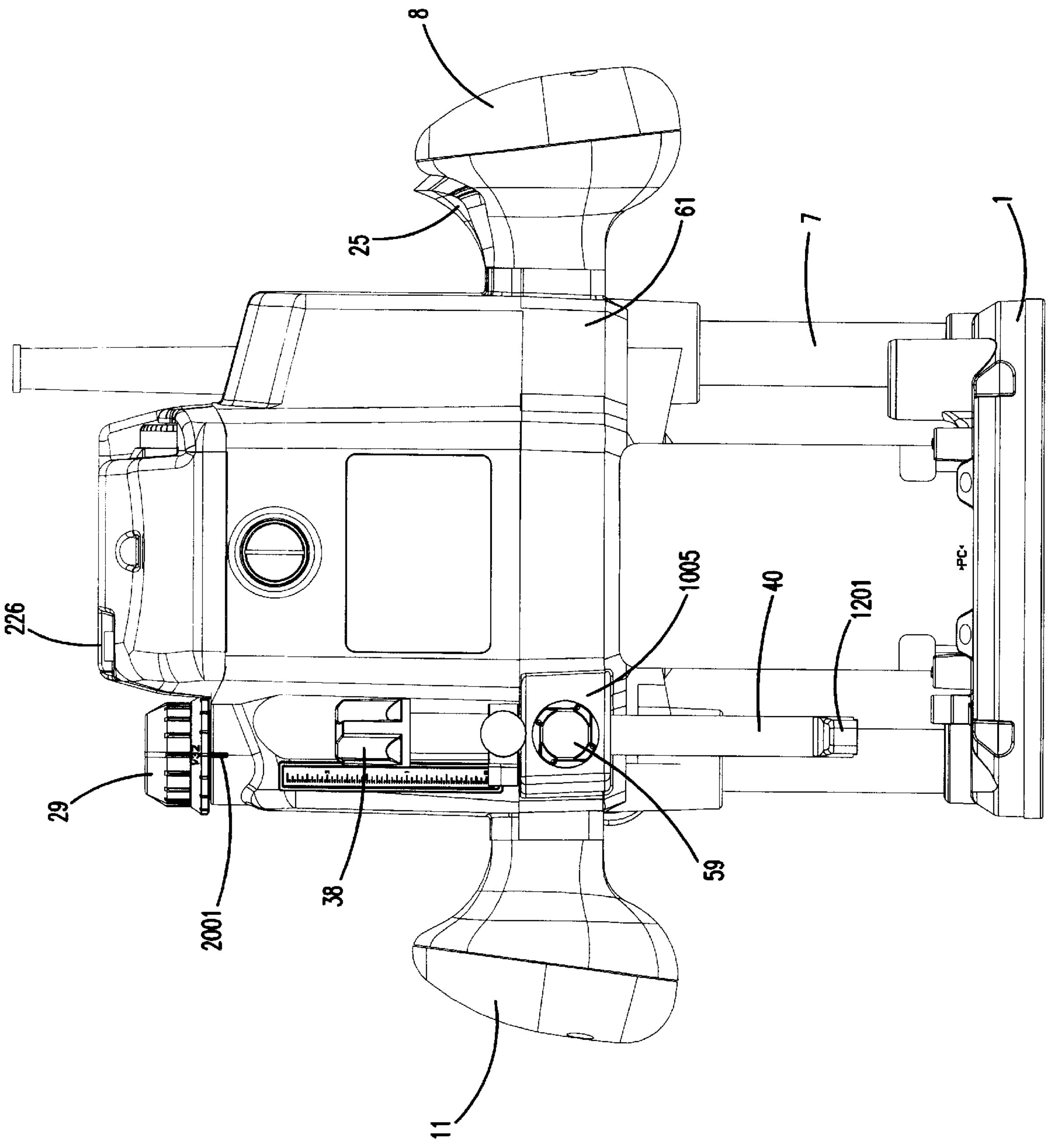
FIG. 2 illustrates a front view of a plunge router which incorporates the present invention.
Figure 3:
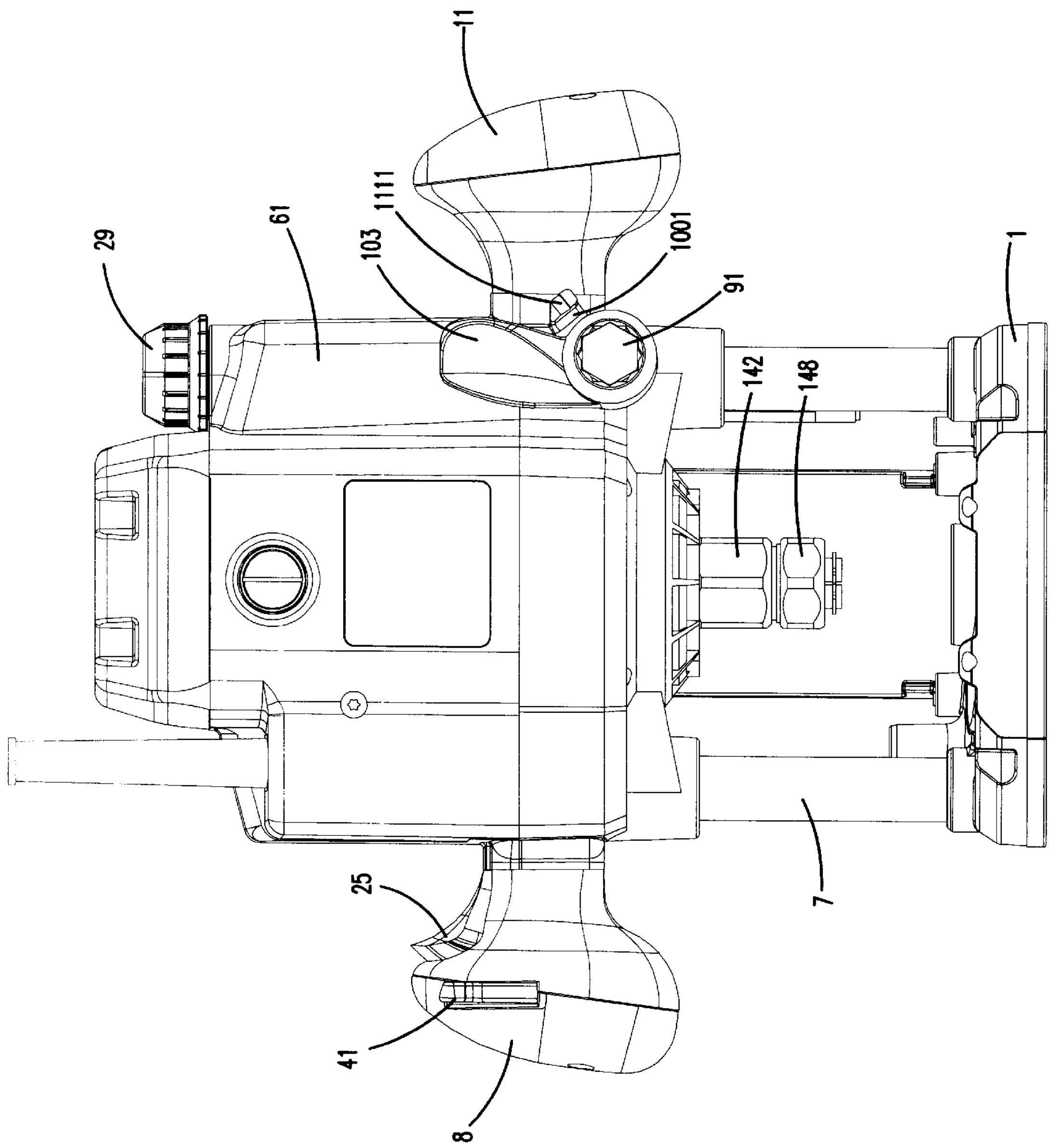
FIG. 3 illustrates a back view of a plunge router which incorporates the present invention.
Figure 4:
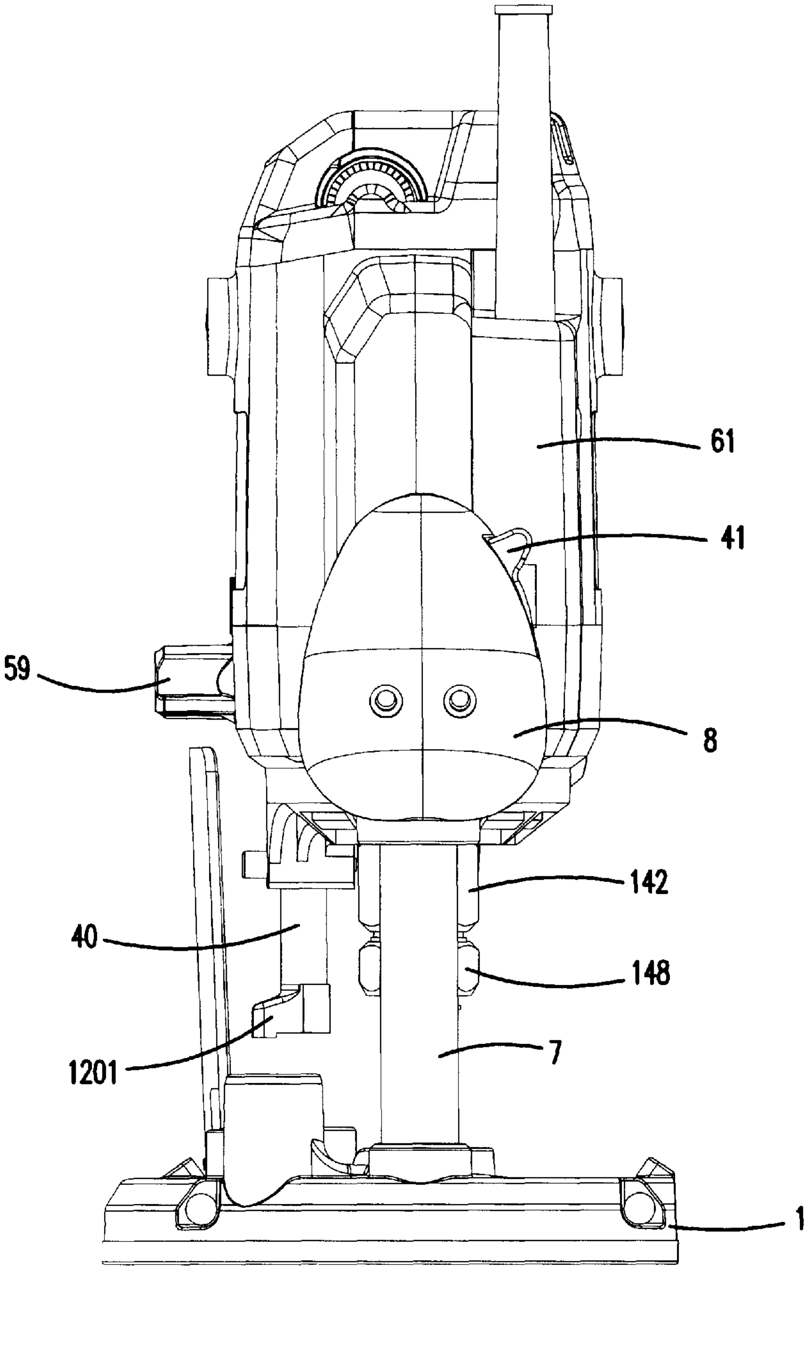
FIG. 4 illustrates a side view of a plunge router which incorporates the present invention.
Figure 5:
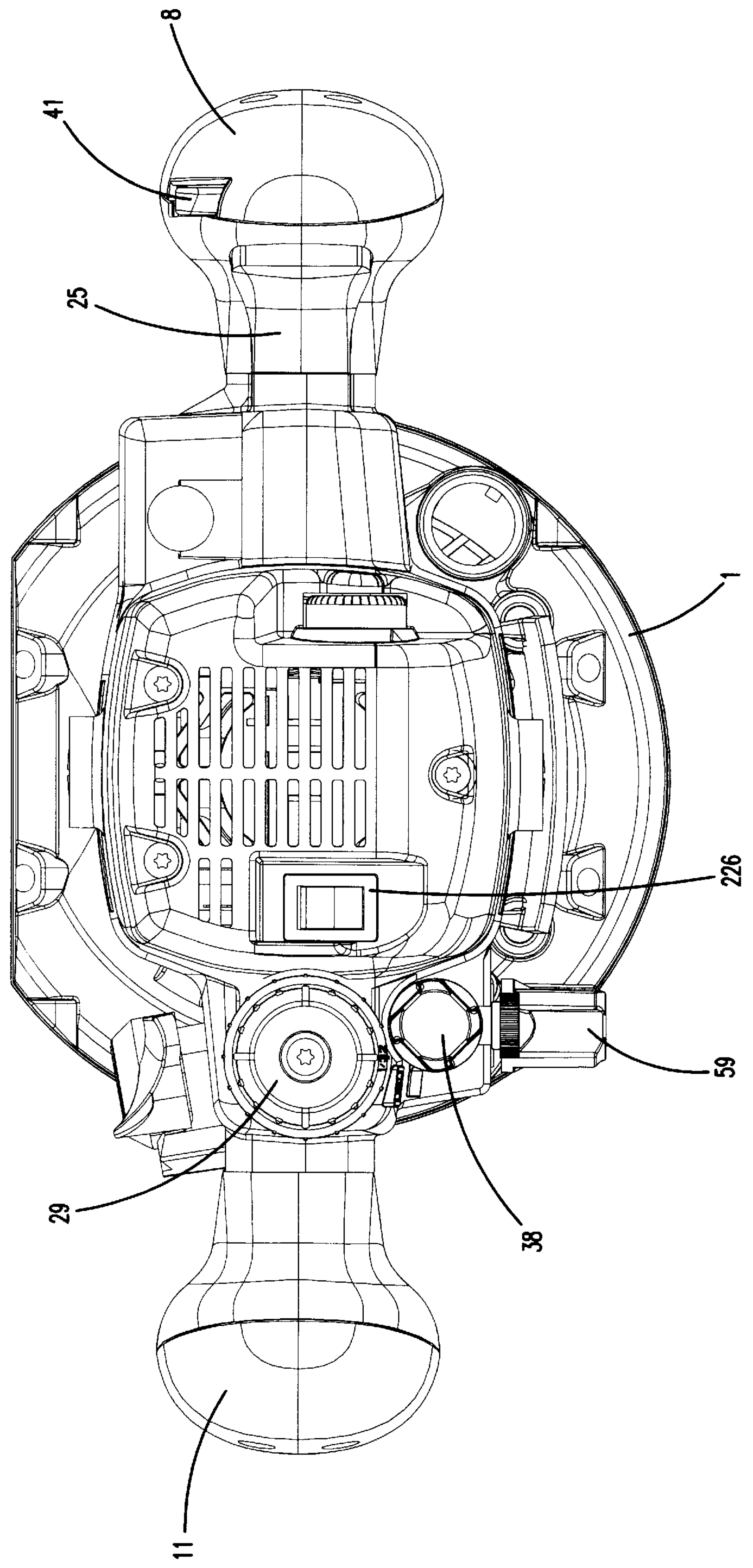
FIG. 5 illustrates a top view of a plunge router which incorporates the present invention.
Figure 6A:
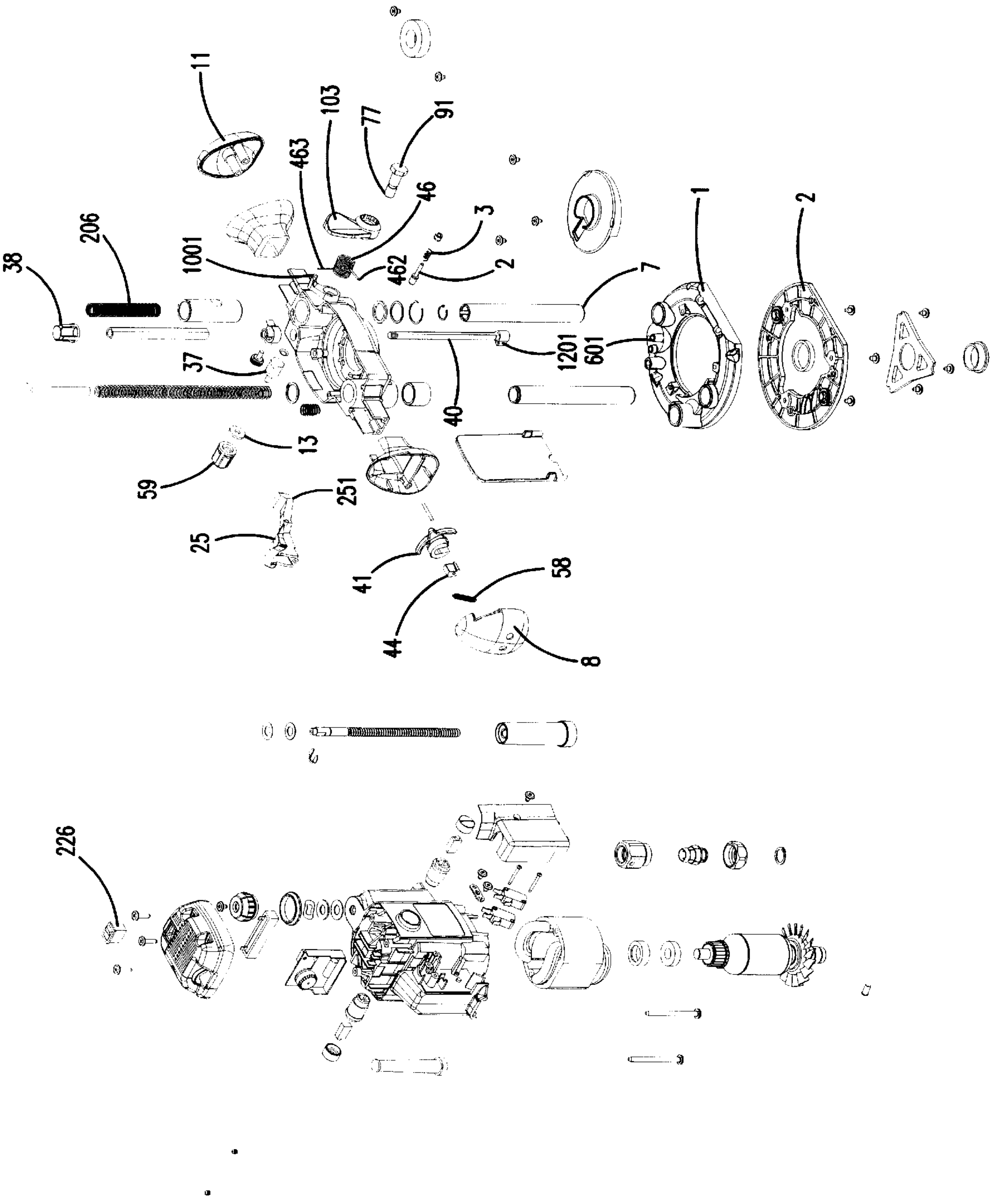
FIG. 6A illustrates an exploded view of the components of a router according to an example embodiment of the present invention.
Figure 6B:
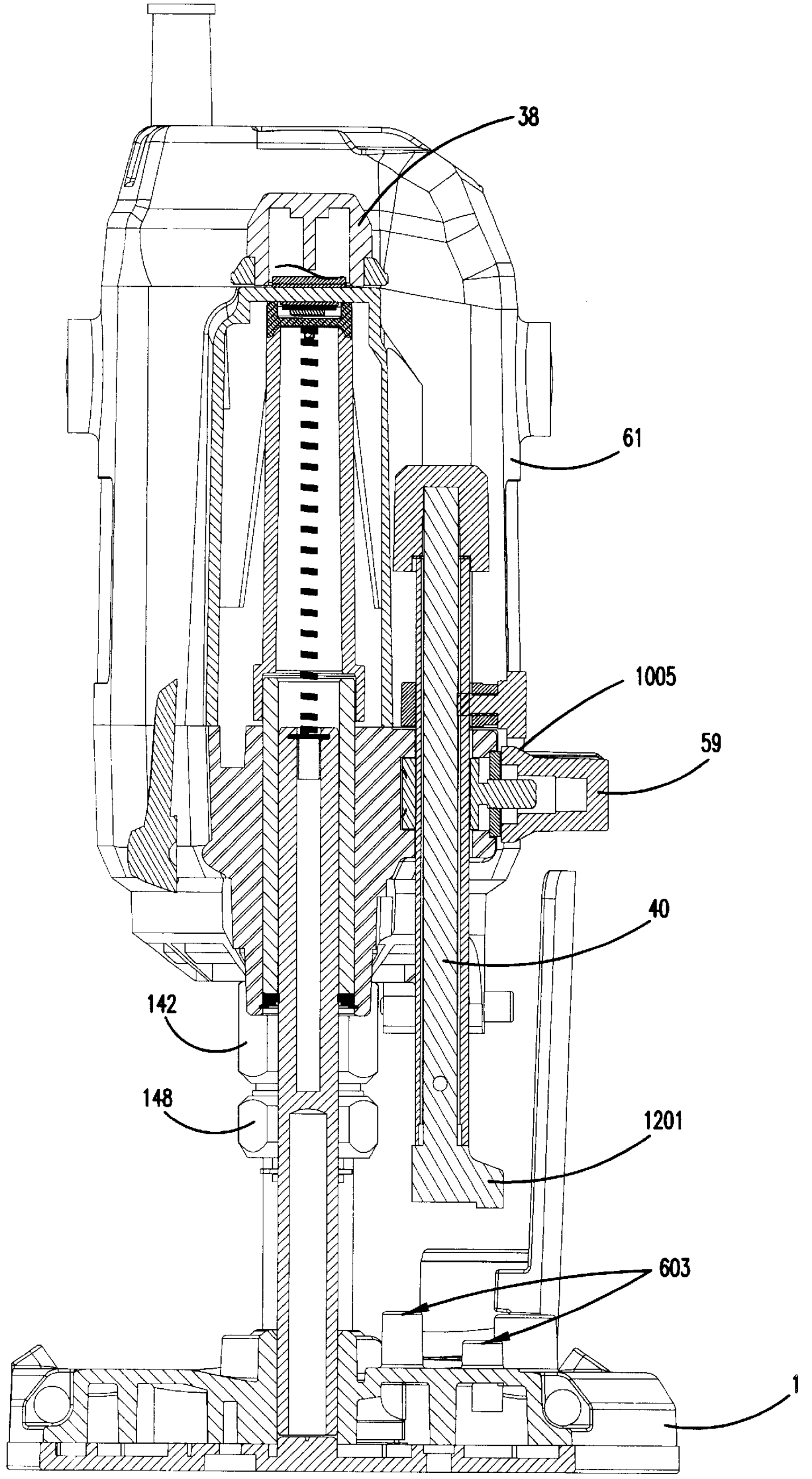
FIGS. 6B, 6C, and 6D illustrate additional views of the components of a router according to an example embodiment of the present invention.
Figure 6C:
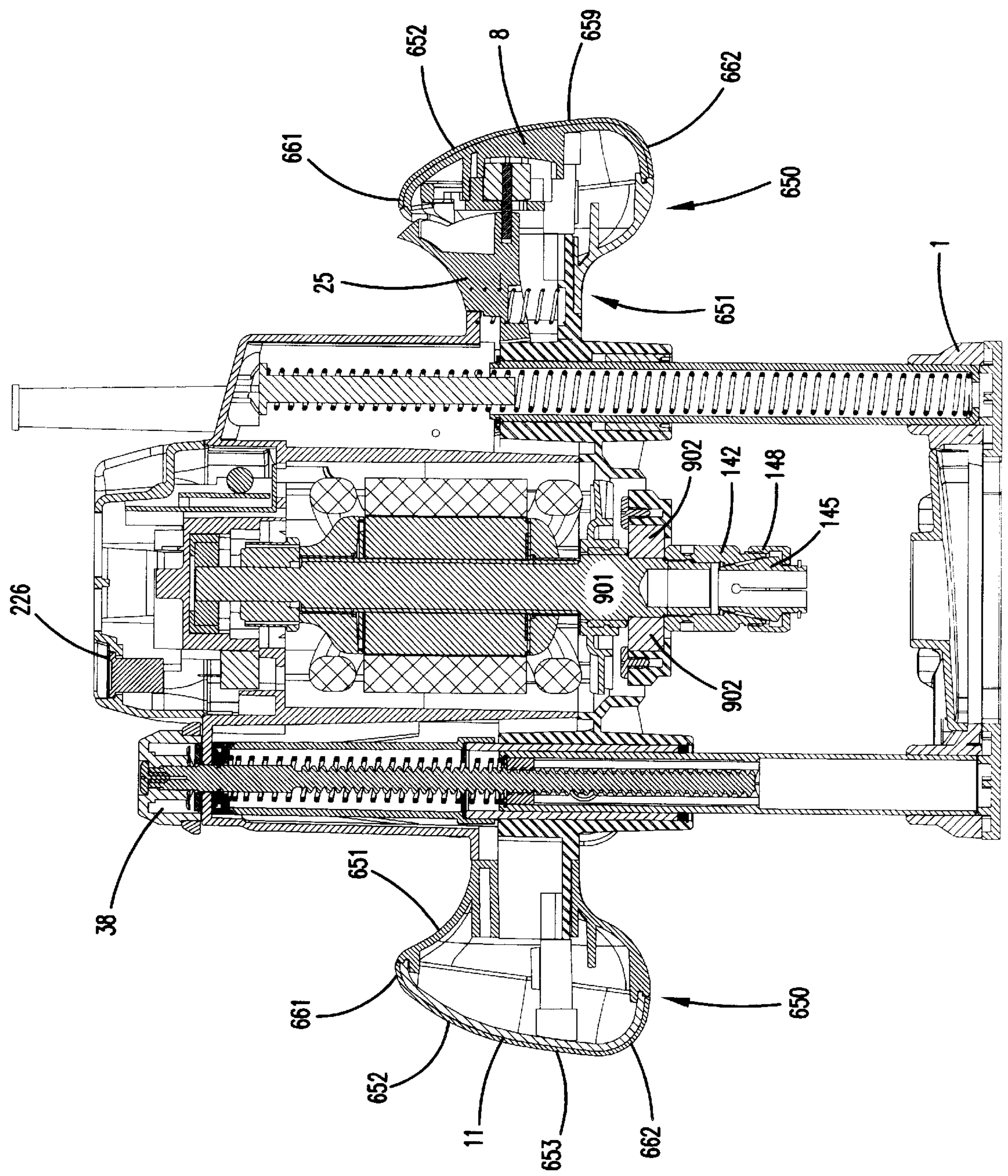
Figure 6D:
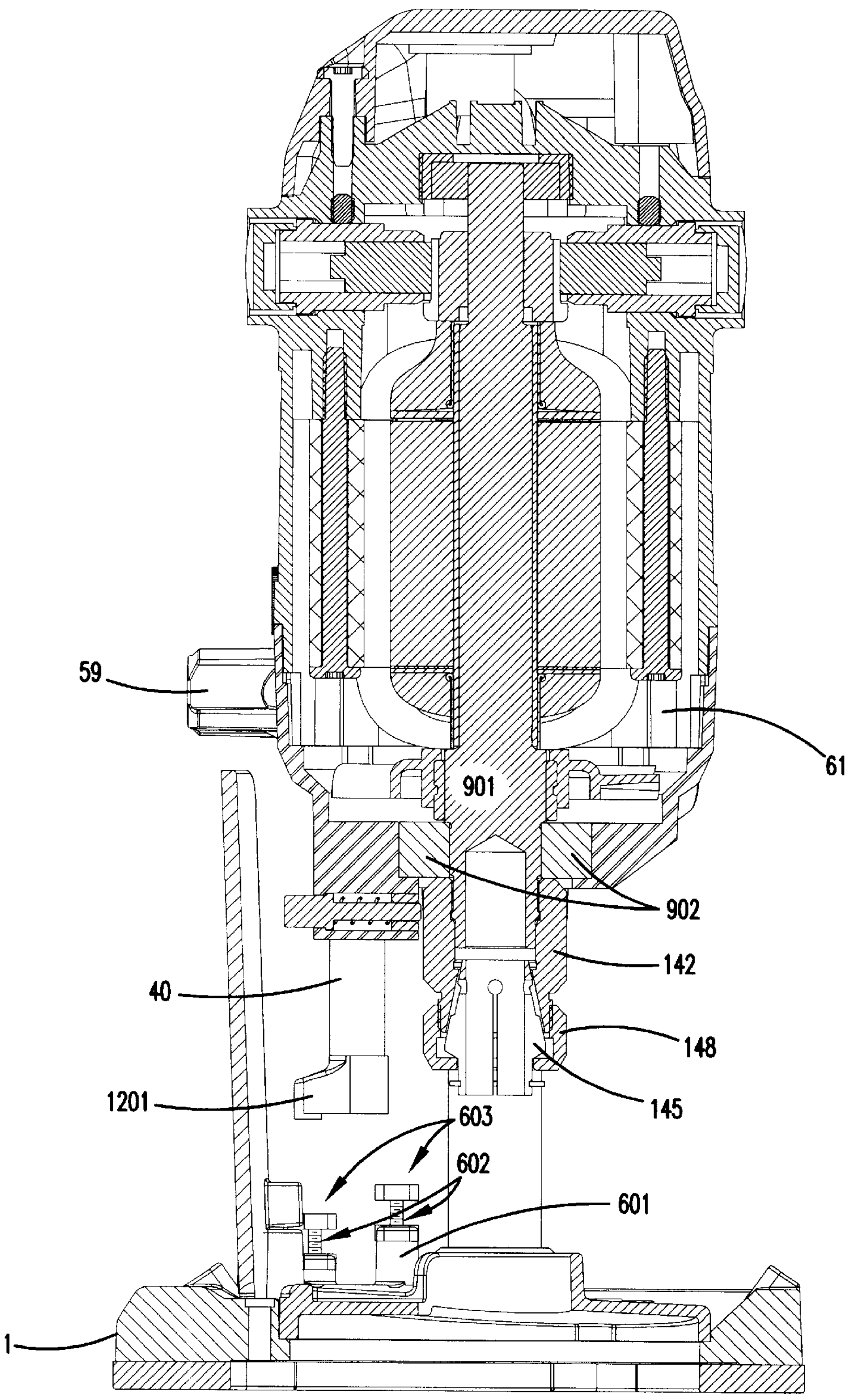

Using the adjustable depth stop system, an operator can perform a series of cuts at increasingly deeper positions, with a known separation between each of the stops (as established by the depth stop position surfaces 603) in order to allow for efficient and accurate cutting of the work piece material without the need to remove their grip from the router handles to adjust the depth stop system. In alternative embodiments of the present depth stop invention, the step-wise rising depth stop system 601 can be either affixed to or integral with router base 1 and can contain any number of rising stop positions. Additionally, the step-wise rising stop system 601 can comprises machine screws adjustable with threaded apertures defined by system 601 in order to provide step-wise rising depth stop at a plurality of heights set by the machine screws 602, as shown in FIG. 6D.

The depth stop rod 40 itself may comprise a turret knob 38 located proximate the opposite end from the selection member protrusion portion. Turret knob 38 typically is located near the top of the router motor housing and is configured to permit the depth stop rod 40 to be rotated within the restraining collar using a thumb motion of an operator.

The adjustable restraining device 1005 within the restraining collar 1004 comprises a rotatable knob 59, a spring washer 13, and a cylindrical screw having a threaded post located on one side of the cylindrical screw to connect the rotatable knob to the restraining device 1005 and also to define a length-wise hole 1006 through the screw 37. Spring washer 13 may be located about the threaded post between the rotatable knob 59 and the cylindrical screw 37, and the depth stop rod is located within the length-wise hole 1006 of the cylindrical screw 37. The depth stop rod 40 is configured to both rotate and slide vertically within the length-wise hole of the cylindrical screw 37 when the rotatable knob 59 is rotated to an outward position. The depth stop rod 40 preferably is held in place using a frictional force between the contact surfaces of the cylindrical screw 37 and the depth stop rod 40 when the rotatable knob 59 has rotated to an inward position. As the knob rotates inward on the threaded post of the cylindrical screw 37, contact between the cylindrical screw 37 and the depth stop rod 40 is made. Friction between the screw 37 and the rod 40 holds the depth stop rod 40 in place.

Ergonomic Router Handles

According to a preferred embodiment, the present router comprises one or more ergonomic handles 8 and 11 for use in holding the router during use. In such and embodiment the router comprises a motor, a motor housing surrounding the router motor, a router base, first and second router handle coupled to opposing sides of the motor housing, and a trigger switch used to engage the router motor. One particular embodiment of the trigger switch 25 is described above when discussing the lock out mechanism.

The first and second router handles, 11 and 8, have an outside surface, a handle circumference 650 which is generally parallel to the armature shaft, an inner surface portion 651 located within the handle periphery and being configured to connect the handle to the motor housing, and an outer surface portion 652 located within the handle periphery and being configured to provide a gripping surface for the user to grip the first and second router handles. Preferred trigger switch 25 is configured move in and out of the first handle and is configured to become flush with the inner surface portion when the trigger switch 25 has been moved into the on position.

In a router with two similar or identically shaped handles, such as on each side of the router motor housing, the first and second router handles are configured to provide an infinite number of user grip angles between the outside surface 652 of the router handles and the motor housing itself to provide an infinite number of comfortable gripping positions for a user to hold the handles. In order to accomplish this objective, the handle periphery of the first and second router handles typically has an elliptical shape and has an upper 661 and lower side 662, with the upper side 661 being more narrow than the lower side 662. The outer portion 652 of the first and second router handles is configured to curve outward from the outer handle periphery 650. The inner portion of the handles 651 slopes from the outer handle periphery back toward the motor housing 61 to provide a place for the user to grip the handles with the operator's thumbs located between the outer handle periphery and the motor housing.

The outer portion 652 of the first and second router handles preferably comprises a substantially flat tactile soft gripped area 654 proximate the center of the outer portion 652. The outer surface of the second handles may be over molded with a thermal elastomer material.

The Plunge Router Fine Adjustment System

In another example embodiment of the present invention, a plunge router comprises the fine depth adjust system. Such a plunge router comprises a router motor, a motor housing surrounding the motor 61, a router base 1, and at least one guide post 7 coupled to the base at one end to support the motor housing at a plurality of selectable heights above the base 1. A plunge router depth adjust system preferably also comprises a plunge lock lever 103 which has both a locked and an unlocked position. The plunge lock lever 103 is coupled to the motor housing 61 and is configured to lock the motor housing 61 at a plurality of positions along the plurality of guide posts 7.

The preferred adjustable fine depth adjustment system comprises a micro adjust knob 29 which is located at the top of a plunge guide posts 7. The micro adjust knob 29 is configured to adjust the plunge stop position within the first guide post.

As with most plunge routers, an operator typically will want to set the plunge position to which the plunge router moves the motor housing down on plunge guide posts 7 in order to stop at some known desired position. This desired position, having a set distance relative to the cutting end of the router bit, defines how deep the router bit will cut into the material being routed. In the embodiment shown, micro adjust knob 29 rotates to move this plunge position up and down the plunge guide posts relative to the router base 1. The adjustable bit stopping system of the present router typically comprises a bias system 206 configured to provide a lifting force between the router base 1 and motor housing 61 in order to maintain a separation between a router base 1 and motor housing 61 when the plunge lock lever 103 is in an unlocked position. When the plunge lock lever 103 is in the locked position, the plunge lock lever 103 holds the router housing at a particular vertical position, and the bias system 206 is not needed. However, when the plunge lock lever 103 is in the unlocked position, the motor housing 61 is free to move along one or more guide posts 7, and bias system 206 typically is needed to prevent motor housing 61 and thus the router bit from falling into the material being cut.

The present plunge router fine adjustment system 1310 is configured to move a plunge stop position between an upper stop 1301 in which the motor housing is at its maximum separation from the router base and a lower stop limit 1302. The adjustment system 1310 is further configured to directly increase or decrease the separation of the motor housing 61 from the router base 1 as micro adjust knob 29 rotates when the plunge stop position is located at its lower limit 1302. The motor housing 61 is configured to move between the maximum separation and the plunge stop position when the plunge lock lever 103 is located in its unlocked position as discussed before.

In the preferred embodiment, the adjustable bit depth stopping device comprises a depth stop nut 16 which is located within a guide post, such as first guide post 7. This depth stop nut 16 also defines a threaded hole proximate the center of the depth stop nut and is configured to accept a threaded shaft 172 which has a corresponding threaded diameter. Threaded shaft 172 is coupled at one end to the micro adjust knob 29. Shaft 172 passes through the nut 16 with shaft threads 1311 mating with the threads on the inner surface of the hole through the center of the depth stop nut 16. Accordingly, the threaded shaft 172 is configured to cause the depth stop nut 16 to travel along the threaded shaft as the micro adjust knob is rotated. When micro adjust knob 29 is rotated in a first direction, nut 16 moves upward. When micro adjust knob 29 is rotated in the opposite direction, nut 16 will move downward. Accordingly, nut 16 moves up and down along the threaded shaft between maximum height 1301 the lower stop limit 1302.

Figure 13A:
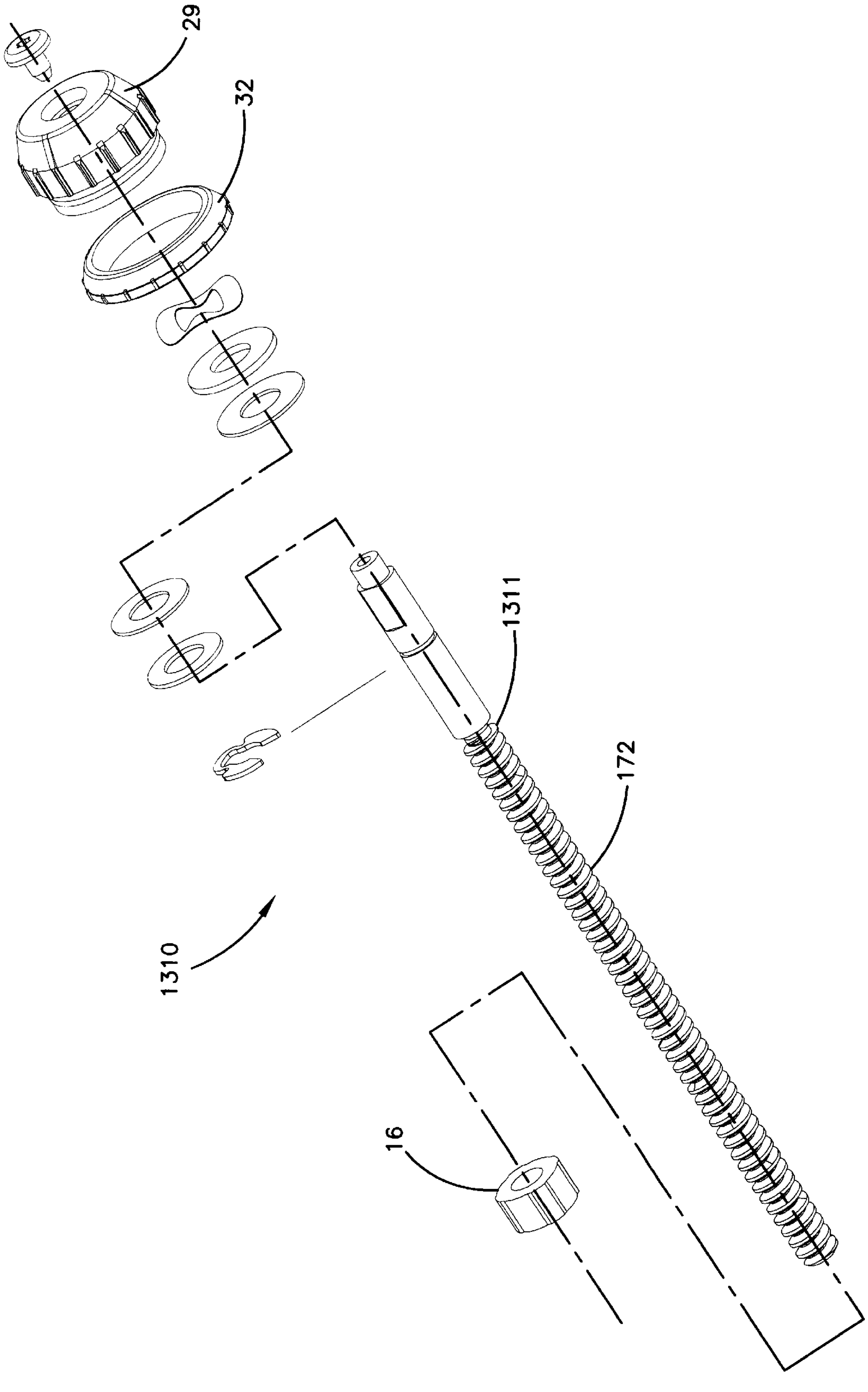
FIG. 13A illustrates a portion of a micro-adjust system according to an example embodiment of the present invention.
Figure 13B:
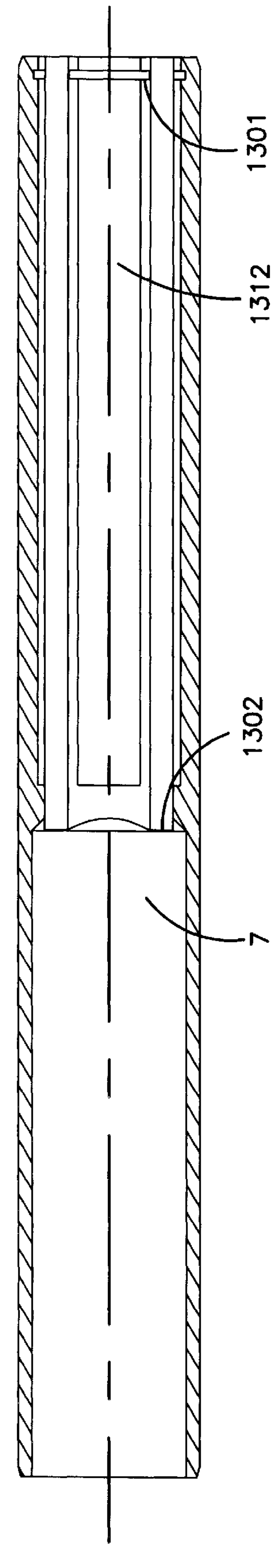
FIG. 13B illustrates a plunge guide rod used in combination with a portion of a micro-adjust system according to an example embodiment of the present invention.
Figure 14:
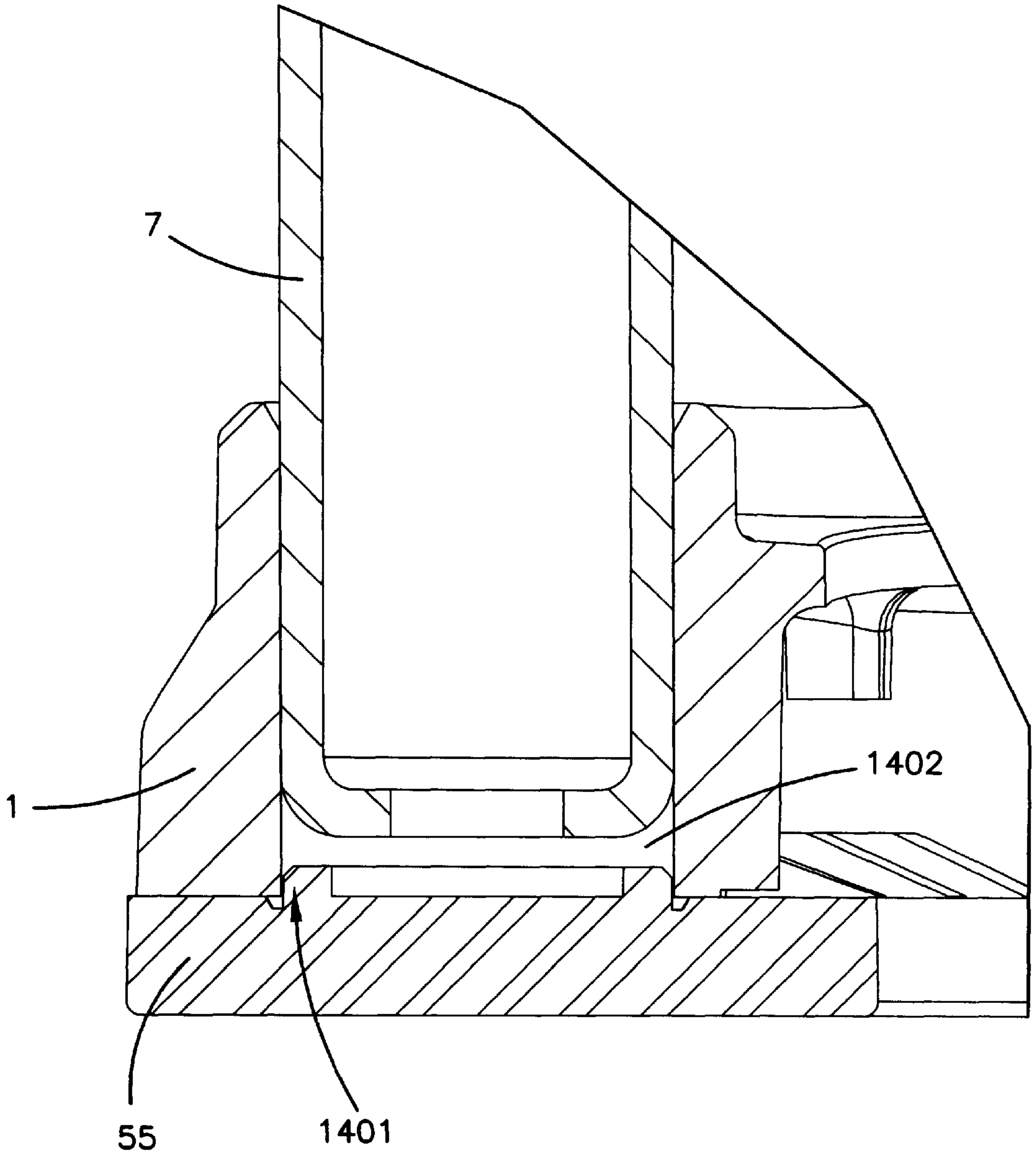
FIG. 14 illustrates a coupling of a router sub-base, router base, and a router plunge guide post as part of an example embodiment of a sub-base alignment system according to another example embodiment of the present invention.

The lower stop position 1302 for nut 16 corresponds to the plunge stop position being at the lower stop limit 1302. Micro adjust knob 29 is also coupled to the motor housing in order to prevent the motor housing from moving closer to the router base once the depth stop nut is at the lower stop position. The depth stop nut travels within a hole 1312 that is sized and shaped to mate with the outer configuration of the nut 16 within the first plunge guide post 7 as shown in FIG. 13B and moves up and down as the motor housing moves up and down. When the nut 16 reaches its lower position, the nut 16 can go no further. The end portion of the threads of nut 16 prevent the threaded shaft from going down any further, which in turn prevents the micro adjust knob from moving. Since micro adjust knob 29 is coupled to the motor housing 61, it defines a stop at which the motor housing 61 can travel.

When depth stop nut 16 is located at its lower stop limit 1302, the threaded shaft 172 may continue to rotate in a direction which continues to lower the motor housing 61 toward the router base 1. In the preferred embodiment, an operator can continue to turn the micro adjust knob 29 to precisely lower the motor housing 61 toward the router base 1, since the threads of the threaded shaft 172 are configured such that, with each rotation of the micro adjust knob 29, the motor housing will move one-eighth of an inch.

A bias system which is part the present adjustable bit stop system comprises a compression spring 206 which is located between the top of the first guide post 7 and the motor housing 61. Threaded shaft 172 travels through the center of a compression spring 206, and the compression spring 206 is compressed to create a bias force as the motor housing 61 travels down the guide posts 7 toward the router base 1.

To operate the micro adjust depth stop system, an operator may follow steps set forth below. First, micro adjust knob 29 generally is rotated clockwise far enough to allow the router to be plunged to a location that permits the lower end of the router bit to contact the workpiece surface. Second, while maintaining the cutting bit in contact with the work piece, the operator locks the power head to guide post 7 by moving plunge lock lever 103 from the unlocked to locked position. Third, the operator turns micro adjust knob 29 counterclockwise until it stops moving once depth stop nut 16 reaches its lower position.

While maintaining micro adjust knob 29 at this stop orientation, the operator zeros index ring 32 to an index mark 2001 which in the preferred embodiment is located on the front of the housing just below index ring 32. Without disturbing the orientation of index ring 32 to knob 29, the operator rotates knob 29 clockwise one revolution of the knob, which in the preferred embodiment equals one-eighth inch adjustment, until the desired depth has been dialed in. Next, the operator releases plunge lock lever 103 to raise motor housing 61 from router base 1 to begin operating the router motor using an engagement switch, such as trigger switch 25. Once the motor is running, the operator may plunge the router downward to its stop position. The router will not drive the cutting bit any farther into the work piece than the previously-dialed-in depth as defined by micro adjust knob 29. Once at this depth position, an operator may lock the plunge lock 103 and perform the relevant task.

Once the particular cut desired has been completed, the operator can unlock plunge lock lever 103 and raise the router from this plunged position until the bit is above the bottom of the sub-base 1. The preferred router will continue to plunge to this previously dialed-in depth until the operator adjusts the stopped position using micro adjust knob 29 as defined above, or until the operator repositions the cutting bit in the chuck.

Depth stop rod 40, with its selection protrusion member portion 1201, which engage the stepwise rising depth stop 601 located on the router base 1, may be used in conjunction with the present micro adjust depth stop feature if the operator wishes to step down the depth to a dialed-in depth. Otherwise, the depth stop rod 40, with its protrusion selection member portion, may be raised near its maximum height and clamped out of the operator's way.

Although the drawings and description herein depict the present fine-adjust system to operate in a hand-held plunge router, the present fine-adjust system may be used in alternate embodiments such as in a router table, or such as in the present router mounted upside down as part of a router table.

Plunge Router Sub-Base Alignment System

According to another embodiment of the present invention the present router may comprise a sub-base alignment system. In such a system, the router comprises a router motor, a motor housing 61 surrounding the router motor, and a router base 1 comprising a sub-base 55. Although applicable to non-plunge routers as well, the drawings and descriptions depict the present sub-base alignment system configured with a plunge router comprising a plurality of plunge guide posts 7 used to support the motor housing 61 at a plurality of heights from the router base 1. The present sub-base alignment compares a plurality of raised bosses 1401 located on sub-base plate 55 at positions to permit the bosses 1401 to engage a plurality of recessed cavities 1402 within the base plate. In the plunge router embodiment shown, the plurality of plunge rod posts 7 each mate with the base plate 1 at matching guide post cavities defined by router base 1, to place the base plate 1 at a known position relative to the center of rotation of the router. In the preferred embodiment, the upper end of the plunge rod posts 7 mate the motor housing 61 at known positions. As shown in the drawings, the raised bosses 1401 may be located on the router sub-base 55 and are similarly located at known positions in order to place the outer periphery of router sub-base 55 at a desired position relative to the center of rotation of the router chuck by having the raised bosses 1401 mate with the recessed cavities 1402.

In the preferred embodiment, the recessed cavities 1402 defined by the base plate 1 are machined at predetermined locations to precisely locate the cavities relative to the mating positions of plunge guide posts 7 within base plate 1. Given this configuration, the components of the motor housing 61, the plunge guide posts 7, the base plate 1, and the sub-base 55, are all configured to a set of points which have known references to each other all relative to the center point of the router.

In the preferred embodiment, sub-base 55 comprises a straight edge 1403 on at least one side such that the straight edge 1403 has a fixed desired position of relative to the raised bosses 1401. In such a configuration, straight edge 1403 will have a known position relative to the center of rotation for the router motor and thus the center of rotation for cutting tool, such that an operator can position the cutting tool in a desired position for the entire length of a cut, such as with a straight-edge member acting as a guide fence. In the sub-base shown, a portion 1404 of sub-base edge 55 also may be curved. The curved edge portion 1404 of sub-base 55 may have a fixed radius from the center of rotation of the router motor, and curved edge 1404 has a known position relative to the raised bosses 1401, such that the curved edge 1404 has a known position relative to the center of rotation of the router motor. In one particular embodiment, the curved surface 1404 is circular about the rotation of the router motor, such that the curved edge 1404 of the sub-base 55 can be used to guide the router motor along a straight cut at any rotational position of the router, such that the rotational position of the router will not affect the position of the cut relative to an edge guide used to guide the router along the sub-base.

While the drawings and descriptions herein illustrate the raised bosses 1401 as being located on the sub-base 55 and illustrate the recesses cavities as being located on the base 1, the recessed bosses and recessed cavities may be located on either, or both the sub-base and base without departing from the scope and spirit of the sub-base alignment system, as long as a recessed boss mates with a recessed cavity at a known locations. The present alignment system may also be employed in any router, laminate trimmer, or similar tool that possess a base and sub-base combination.

The foregoing description of the exemplary embodiment of improved router features has been presented for the purposes of illustration and description. The preceding description is not intended to be exhaustive or to limit any of the disclosed inventions. Many modifications and variations are possible. It is intended that the scope of the present router inventions be limited not with this detailed description, but rather by the claims appended hereto.

What is claimed is:

1. A router having a locking system used to engage and lockout the operation of a router motor, the router comprising:

the router motor;

a motor housing surrounding the router motor;

a first router handle having an outer periphery;

a trigger located on the first handle and being configured to activate the router motor, the trigger having an on position and an off position; and a locking lever located within the first handle, the locking lever having an arm member protruding out of the first handle about a portion of an outer circumference of the first handle to permit the locking lever to be operated by an index finger of an operator, the locking lever also having a locked position, an unlocked position, and a locked-on position;

wherein:

the trigger is configured to move into and out of the first handle when operated by a user;

the locking lever is configured to move along a portion of the outer periphery of the first handle; and the trigger and the locking lever are configured to operate together such that the trigger will not operate until the locking lever is moved from the locked position to the unlocked position.

2. The router according to claim 1, wherein the trigger is located on the first handle between the motor housing and the outer periphery of the first handle.

3. The router according to claim 2, wherein the router further comprises an electrical switch and a connection to an external electrical power source, the electrical switch is configured to close an electrical circuit in order to connect the router motor to the electrical power source; and the trigger is configured to be a thumb-activated lever coupled to the electrical switch which is connected in a circuit with the router motor and the external electrical power source.

4. The router according to claim 3 wherein the trigger becomes flush with the outside periphery of the first handle when fully depressed into the first router handle.

5. The router according to claim 4, wherein the locking lever is further configured to hold the trigger in the on position when the locking lever is in the locked-on position.

6. The router according to claim 5, wherein locking lever is further configured to release the trigger from the on position when the trigger is depressed while the locking lever in the locked-on position.

7. The router according to claim 6, wherein the outer periphery of the first handle is substantially perpendicular to the motion of the trigger switch into and out of the first handle.

8. The router according to claim 1, wherein the locking system further comprises:

a spring extension;

a locking lug; and a lug axle member;

wherein:

the locking lever defines a slot through which the locking lug can move;

the locking lug slides along the slot when the trigger switch is depressed after the locking lever is rotated from the locked position in order to align the locking lug with the slot;

the locking lug rotates about the lug axle;

the locking lever is located within a path of motion of the locking lug when in the locked position to prevent the trigger from being depressed;

the locking lever is located outside of the path of motion of the locking lug when in the unlocked position as the locking lug is aligned with the slot in the locking lever in order to allow the locking lug to move on the lug axle when the switch is depressed;

the locking lever and locking lug are configured to engage the each other when the trigger is depressed to hold the trigger in the on position; and the spring extension is configured to rotate the locking lug about the lug axle member to release the switch from the on position when the trigger is depressed once the locking lever is engaged by the locking lug.

9. The router according to claim 8, wherein the locking lug is configured to prevent the locking lug from engaging the locking lever to hold the trigger in the on position after the locking lug is rotated 180° about the lug axle when assembled.

10. A router having a locking system for use with a plunge router having a router motor housing surrounding a router motor, the router comprising:

a first router handle having an outer periphery;

a thumb-activated trigger located on the first handle, the trigger being configured to be depressed to an on position to activate the router motor and the trigger being further configured to be released to an off position to deactivate the router motor; and a locking lever located within the first handle, the locking lever having an arm member protruding out of the first handle about a portion of the outer handle periphery of the first handle to permit the locking lever to be operated by an index finger of a user, the locking lever also having a locked position, unlocked position and a locked-on position;

a spring extension;

a locking lug; and a lug axle member;

wherein:

the locking lever defines approximately at its center a slot through which the locking lug can move;

the locking lug is configured to slide along the slot when the trigger switch is depressed;

the locking lug rotates about the lug axle;

the locking lever is located within a path of motion of the locking lug when in the locked position to prevent the switch from being depressed;

the locking lever is located outside the path of motion of the locking lug when in the unlocked position as the locking lug is aligned with the slot in the locking lever in order to allow the locking lug to move on the lug axle member when the switch is depressed;

the locking lever and locking lug engage each other when the trigger is depressed in order to hold the trigger in the on position; and the spring extension rotates the locking lug about the lug axle to release the trigger from the on position when the trigger is depressed once the locking lever is engaged by the locking lug and held in the locked-on position.

11. The router locking system according to claim 10, wherein the locking lever is configured to hold the switch in the on position.

12. The router locking system according to claim 11, wherein locking lever is further configured to release the trigger from the on position when the trigger is depressed while in the on position.

13. The router locking system according to claim 12, wherein the trigger is located between the motor housing and the first handle.

* * * * *